United States Patent
Kurata et al.

(10) Patent No.: US 10,687,473 B2
(45) Date of Patent: Jun. 23, 2020

(54) GRASS MANAGEMENT SYSTEM AND GRASS MANAGEMENT METHOD

(71) Applicant: Kubota Corporation, Osaka-shi (JP)

(72) Inventors: Ryo Kurata, Sakai (JP); Susumu Umemoto, Sakai (JP); Yoshitomo Fujimoto, Sakai (JP); Shinnosuke Ishikawa, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 85 days.

(21) Appl. No.: 15/989,178

(22) Filed: May 25, 2018

(65) Prior Publication Data
US 2018/0368331 A1 Dec. 27, 2018

(30) Foreign Application Priority Data
Jun. 22, 2017 (JP) .................. 2017-121879

(51) Int. Cl.
| | | |
|---|---|---|
| A01F 15/07 | (2006.01) | |
| A01F 15/08 | (2006.01) | |
| A01B 79/00 | (2006.01) | |
| A01D 34/00 | (2006.01) | |
| A01D 34/66 | (2006.01) | |
| A01D 75/28 | (2006.01) | |
| A01D 78/00 | (2006.01) | |
| B60K 37/02 | (2006.01) | |

(52) U.S. Cl.
CPC ........ *A01F 15/0883* (2013.01); *A01B 79/005* (2013.01); *A01D 34/006* (2013.01); *A01D 34/66* (2013.01); *A01D 75/28* (2013.01); *A01D 78/007* (2013.01); *A01D 78/008* (2013.01); *A01F 15/07* (2013.01); *A01F 2015/0808* (2013.01); *B60K 37/02* (2013.01)

(58) Field of Classification Search
CPC .................. A01F 15/0883; A01F 15/07; A01F 2015/0808; A01B 79/005; A01D 78/008; A01D 75/28; A01D 34/66; A01D 34/006; A01D 78/007
USPC ...................................... 701/50–51
See application file for complete search history.

(56) References Cited

U.S. PATENT DOCUMENTS

| | | | |
|---|---|---|---|
| 7,353,753 B2 | 4/2008 | Viaud | |
| 7,401,547 B2 * | 7/2008 | Degen | A01F 15/08 100/35 |
| 9,930,834 B2 * | 4/2018 | Chaney | A01F 15/08 |
| 10,091,943 B2 * | 10/2018 | Cracraft | A01F 15/0883 |

(Continued)

FOREIGN PATENT DOCUMENTS

| | | | | |
|---|---|---|---|---|
| AU | 2017210613 A1 * | 3/2018 | ......... | A01F 15/0883 |
| CA | 2896140 A1 * | 1/2016 | ......... | A01F 15/0765 |

(Continued)

OTHER PUBLICATIONS

Extended European Search Report for corresponding EP Application No. 18178907.4-1006, dated Nov. 19, 2018.

*Primary Examiner* — Cuong H Nguyen
(74) *Attorney, Agent, or Firm* — Mori & Ward, LLP

(57) ABSTRACT

A grass management system includes a prohibition determination circuit and a baler. The prohibition determination circuit is configured to determine a prohibition position. The baler is configured to acquire the prohibition position from the prohibition determination circuit, and eject a bale of grass at a position except for the prohibition position.

14 Claims, 24 Drawing Sheets

(56) References Cited

U.S. PATENT DOCUMENTS

| | | | |
|---|---|---|---|
| 2006/0086263 A1* | 4/2006 | Degen | A01F 15/08 100/88 |
| 2006/0088263 A1 | 4/2006 | Degen | |
| 2013/0218421 A1* | 8/2013 | Millsap | A01D 85/005 701/50 |
| 2016/0014970 A1* | 1/2016 | Kraus | A01F 15/0765 701/50 |
| 2016/0014971 A1* | 1/2016 | Kraus | A01F 15/0875 701/50 |
| 2017/0112069 A1* | 4/2017 | Kraus | A01F 15/0765 |
| 2017/0118918 A1* | 5/2017 | Chaney | A01F 15/08 |
| 2018/0064032 A1* | 3/2018 | Cracraft | A01F 15/0883 |
| 2018/0184594 A1* | 7/2018 | Chaney | A01F 15/08 |
| 2019/0045718 A1* | 2/2019 | Kraus | A01F 15/0765 |

FOREIGN PATENT DOCUMENTS

| | | | | |
|---|---|---|---|---|
| EP | 1604565 | | 12/2005 | |
| EP | 1604565 A1 | * | 12/2005 | A01F 15/08 |
| EP | 1692928 | | 8/2006 | |
| EP | 2974592 A1 | * | 1/2016 | A01F 15/0765 |
| EP | 2974594 | | 1/2016 | |
| EP | 3025578 A1 | * | 6/2016 | A01F 15/0875 |
| EP | 3162189 | | 5/2017 | |
| EP | 3162189 A2 | * | 5/2017 | A01F 15/08 |
| WO | WO-2014031355 A1 | * | 2/2014 | A01F 15/08 |
| WO | WO 2017/058006 | | 4/2017 | |

\* cited by examiner

FIG. 5

| POSITION OF FARM FIELD (POSITION OF FIELD) | | PROHIBITED AREA A1 (PROHIBITED POSITION) | | WHETHER PROHIBITED POSITION IS SET |
|---|---|---|---|---|
| LATITUDE | LONGITUDE | LATITUDE | LONGITUDE | |
| 34.40.41 | 135.34.19 | 34.40.41 | 135.34.19 | SET |
| 34.40.42 | 135.34.19 | 34.40.42 | 135.34.19 | SET |
| 34.40.43 | 135.34.19 | 34.40.43 | 135.34.19 | SET |
| ⋮ | ⋮ | ⋮ | ⋮ | SET |
| 34.40.45 | 135.34.19 | 34.40.45 | 135.34.19 | SET |
| 34.40.46 | 135.34.19 | — | — | NOT SET |
| 34.41.27 | 135.35.11 | — | — | NOT SET |
| 34.41.28 | 135.35.11 | — | — | NOT SET |
| 34.41.29 | 135.35.11 | — | — | NOT SET |
| 34.41.30 | 135.35.11 | — | — | NOT SET |
| 34.41.31 | 135.35.11 | — | — | NOT SET |
| 34.41.32 | 135.35.11 | — | — | NOT SET |
| 34.41.33 | 135.35.11 | — | — | NOT SET |
| 34.41.34 | 135.35.11 | — | — | NOT SET |
| 34.41.35 | 135.35.11 | — | — | NOT SET |
| ⋮ | ⋮ | ⋮ | ⋮ | NOT SET |

GRASS MANAGEMENT SYSTEM AND GRASS MANAGEMENT METHOD

CROSS-REFERENCE TO RELATED APPLICATIONS

The present application claims priority under 35 U.S.C. § 119 to Japanese Patent Application No. 2017-121879, filed Jun. 22, 2017. The contents of this application are incorporated herein by reference in their entirety.

BACKGROUND OF THE INVENTION

Field of the Invention

The present invention relates to a grass management system and a grass management method.

Discussion of the Background

Conventionally, as a technique of taking in grass of a farm field into a round baler, then forming the taken grass into a roll shape with the round baler and discharging the grass again into the farm, techniques disclosed in European Patent Application Publication No. 2974594 and European Patent No. 1604565 are known. The technique of European Patent Application Publication No. 2974594 sets a discharge line for a formed material to be discharged from a round baler and discharges the formed material when the round baler reaches the discharge line. The technique of European Patent No. 1604565 keeps a constant distance between a first formed material discharged from a round baler and a second formed material to be discharged next to the first formed material.

SUMMARY OF THE INVENTION

According to an aspect of the present invention, a grass management system includes a prohibition determination circuit and a baler. The prohibition determination circuit is configured to determine a prohibition position. The baler is configured to acquire the prohibition position from the prohibition determination circuit, and eject a bale of grass at a position except for the prohibition position.

According to another aspect of the present invention, a grass management system includes prohibition determination means, prohibition determination means, and ejection means. The prohibition determination means are for determining a prohibition position. The acquisition means are for acquiring the prohibition position. The ejection means are for ejecting a bale of grass at a position except for the prohibition position.

According to a further aspect of the present invention, a grass management method includes determining a prohibition position, by a prohibition determination circuit, acquiring the prohibition position, by a baler, and ejecting a bale of grass at a position except for the prohibition position, by the baler.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a diagram illustrating a relationship among prohibited positions, positions of fields, and the prohibited areas.

DESCRIPTION OF THE EMBODIMENTS

Figure 1:
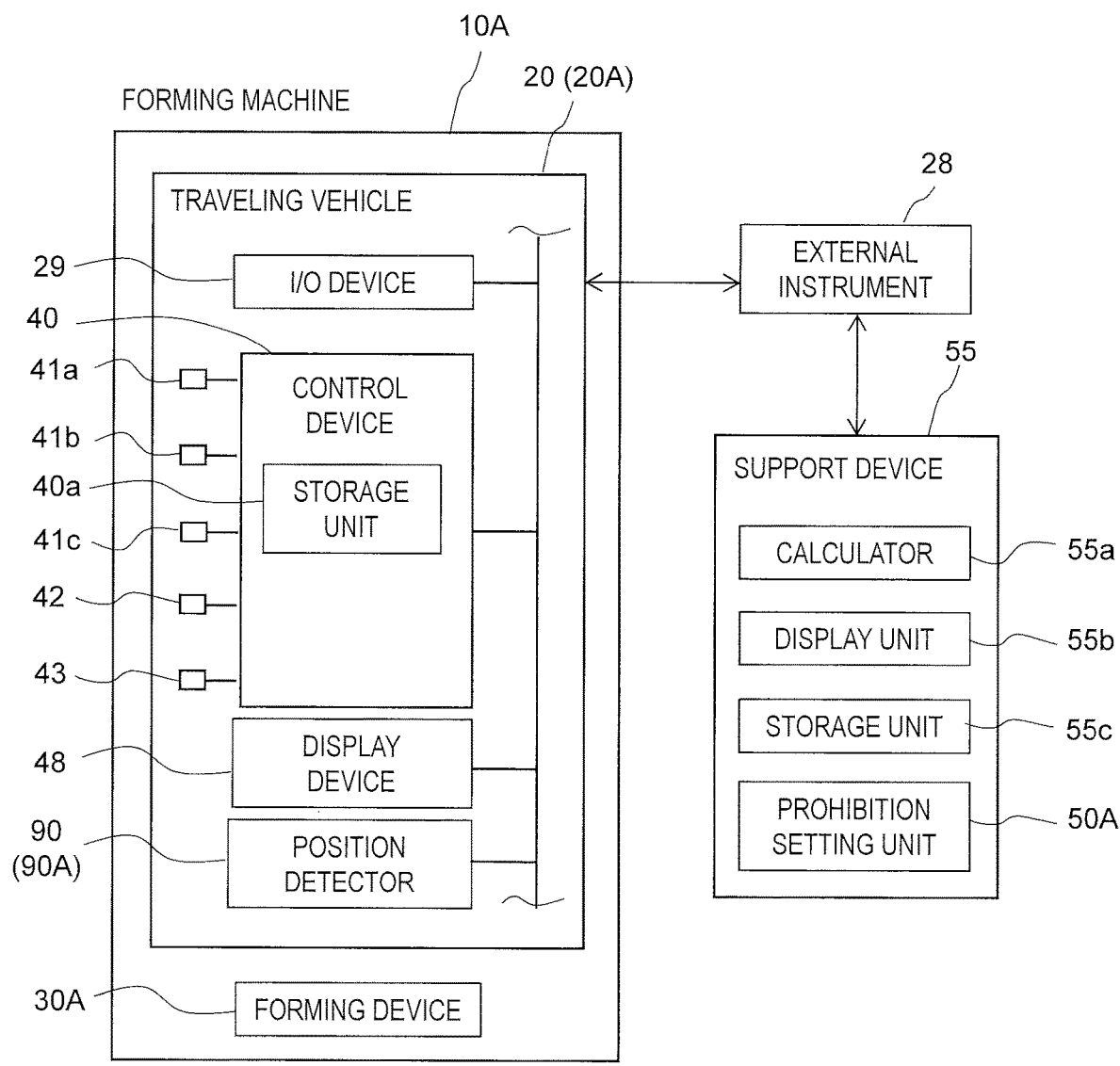
FIG. 1 is an overall diagram of a grass management system in a first embodiment.

The embodiments will now be described with reference to the accompanying drawings, wherein like reference numerals designate corresponding or identical elements throughout the various drawings.

Embodiments of the present invention will be described below with reference to the drawings.

First Embodiment

FIG. 1 is an overall diagram illustrating a grass management system. The grass management system relates to a forming machine (a baler) 10A that can form and discharge grass of a farm field and is a system that can make a setting for discharge of a formed material formed by the forming machine 10A.

First, the forming machine 10A will be described.

The forming machine 10A is a machine that harvests grass of a farm field and forms harvested farm products into a predetermined shape such as a roll shape and a rectangular shape (cube shape). The forming machine 10A is, for example, a round baler that forms grass into a roll shape, a whole crop, a hay baler that forms a rectangular shape, and the like.

Figure 2:
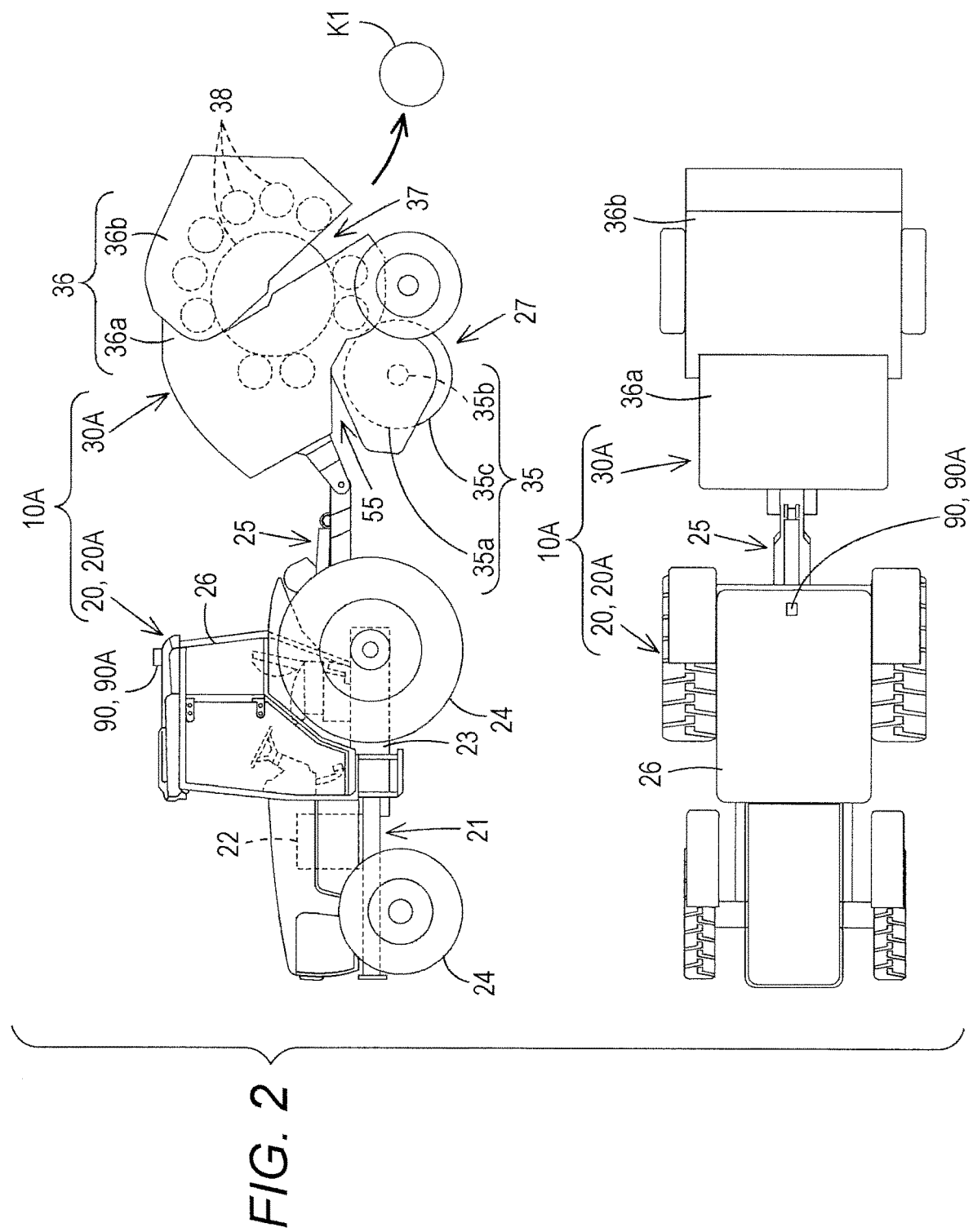
FIG. 2 is a side view and a plan view of an overall forming machine, and a diagram illustrating a formed material.

As illustrated in FIG. 2, the forming machine 10A includes a traveling vehicle 20 and a forming device (a baling device) 30A. The traveling vehicle 20 is a tractor. The traveling vehicle 20 includes a vehicle body 21, a prime mover 22, and a transmission 23. The vehicle body 21 is provided with a traveling device 24. The traveling device 24 is a device having front wheels and rear wheels. The traveling device 24 may be a crawler device. The prime mover 22 is a diesel engine, an electric motor, or the like, and in this embodiment, the prime mover 22 includes a diesel engine. The transmission 23 can switch propulsive force of the traveling device 24 and can switch the traveling device 24 between forward and reverse movements. In addition, a connecting unit 25 including a three-point link mechanism or the like is provided in a rear portion of the vehicle body 21. The forming device 30A is detachable from the connecting unit 25. Connecting the forming device 30A to the connecting unit 25 allows the vehicle body 21 to pull the forming device 30A. Also, the traveling vehicle 20 includes a power take-off (PTO) shaft driven by the power of the prime mover 22 or the like and can transmit the power of the PTO shaft to a work device. Also, the traveling vehicle 20 includes a cabin 26 including a driver's seat therein.

As illustrated in FIG. 1, the traveling vehicle 20 includes an input output device 29 to which an external instrument 28, which is an electronic storage medium such as a USB memory and an SD card, is connected. The input output device 29 is connected to a control device 40 or the like and can write information (data) about the traveling vehicle 20 or the like into the external instrument 28 and acquire information about the external instrument 28.

As illustrated in FIG. 2, the forming device 30A includes a vehicle body 27 capable of moving (traveling) and a gathering unit (a pickup implement) 35 supported by the vehicle body 27 and configured to gather in grass. The gathering unit 35 is a device configured to gather in harvested grass on a farm field from a front side (traveling vehicle 20 side), and includes, for example, a casing 35a whose front side is open. In addition, the gathering unit 35 includes a rotating shaft 35b supported by the casing 35a or the like, and a guide tool 35c fixed to the rotating shaft 35b. Therefore, rotating the rotating shaft 35b allows the guide tool 35c to gather in grass on the farm field into the casing 35a. Note that the gathering unit 35 of FIG. 2 is one example and is not limited to the above-described gathering unit 35.

The forming device 30A includes an accommodation unit 36 and a discharge unit (an ejecting implement) 37. The accommodation unit 36 is a case that accommodates the grass gathered in by the gathering unit 35. The discharge unit 37 is a part that discharges the grass to the farm field. The accommodation unit 36 includes a first case body 36a fixed to the vehicle body 27 and a second case body 36b that is vertically swingable with respect to the first case body 36a. The first case body 36a communicates with the gathering unit 35, and the grass gathered by the gathering unit 35 enters the first case body 36a. A state where the second case body 36b is close to the first case body 36a (state where the second case body 36b is swung downward) is a state where the grass is accommodated (accommodation state). Meanwhile, a state where the second case body 36b is separated from the first case body 36a (state where the second case body 36b is swung upward) is a state where grass is discharged. That is, the discharge unit 37 is formed between the first case body 36a and the second case body 36b when the second case body 36b is swung upward with respect to the first case body 36a. Therefore, the accommodation unit 36 can accommodate the grass and the discharge unit 37 can discharge the grass. Note that the accommodation unit 36 and the discharge unit 37 of FIG. 2 are one example and are not limited to the above-described accommodation unit 36 and the discharge unit 37. Note that for convenience of description, the state where the second case body 36b is swung downward with respect to the first case body 36a may be referred to as a closed state (gate closed state), whereas the state where the second case body 36b is swung upward with respect to the first case body 36a may be referred to as an open state (gate open state).

The forming device 30A includes a forming unit (a baling implement) 38. The forming unit 38 forms the grass gathered by the gathering unit 35. That is, the forming unit 38 is provided in the first case body 36a and the second case body 36b and forms the accommodated grass. The forming unit 38 is, for example, a device configured to form a roll-shaped formed material K1 with a plurality of rotating rollers. The forming unit 38 may be a chain device that forms grass into a roll with a chain, a belt device that forms grass into a roll with a belt, or a device of any other type. Therefore, the forming unit 38 can form the grass gathered by the accommodation unit 36 into a predetermined shape.

As illustrated in FIGS. 1 and 2, the forming machine 10A includes a position detector 90 (position detector 90A). The position detector 90A is installed on a top plate of the cabin 26 of the traveling vehicle 20. Note that although the position detector 90A is installed on the top plate of the cabin 26, an installation place in the traveling vehicle 20 is not limited and may be another place. Alternatively, the position detector 90A may be installed in the forming device 30A.

The position detector 90A is a position detection device that detects a position of the position detector 90A (positioning information including latitude and longitude) with a satellite positioning system. That is, the position detector 90A receives a signal transmitted from a positioning satellite (position of the positioning satellite, transmission time, correction information, and the like) and detects the position (for example, latitude and longitude) based on the received signal. Therefore, the position detector 90A, which is provided in the forming machine 10A, can detect the positions (machine positions at the time of forming work) at the time of work for the glass (at the time of traveling).

As illustrated in FIG. 1, the forming machine 10A includes the control device (control unit) 40. The control device 40 is provided in the traveling vehicle 20. The control device 40 controls the traveling vehicle 20 based on operation signals in response to operation of operation tools (lever, switch, volume, and the like) installed around a driver's seat and detection signals and the like of various sensors (detection devices) mounted in the traveling vehicle 20.

Specifically, a sensor 41a that detects a crank position, a sensor 41b that detects a cam position, and a sensor 41c that detects a rotational speed (engine rotational speed) of the prime mover 22 are connected to the control device 40. The control device 40 controls the prime mover (engine) 22 by outputting a control signal obtained based on signals such as the crank position, the cam position, the engine rotational speed, and the like detected by the sensors 41a to 41c and the like to an injector, a common rail, a supply pump, and the like. Note that in control of the injector, control signals indicating fuel injection quantity, injection timing, and fuel injection rate are output to the injector. Also, in control of the supply pump and the common rail, signals indicating fuel injection pressure and the like are output to the supply pump and the common rail. Note that control of the prime mover (engine) 22 by the control device 40 is one example and is not restrictive.

Also, for example, an elevating lever 42 configured to cause the connecting unit 25 to ascend and descend as an operation tool, and an electromagnetic control valve (not illustrated) configured to expand and contract an oil hydraulic cylinder that causes the connecting unit to operate are connected to the control device 40. When the elevating lever 42 is operated, the control device 40 outputs a control signal to the electromagnetic control valve to set an opening degree of the electromagnetic control valve and causes the connecting unit to ascend and descend by expanding and contracting the oil hydraulic cylinder.

Figure 3A:
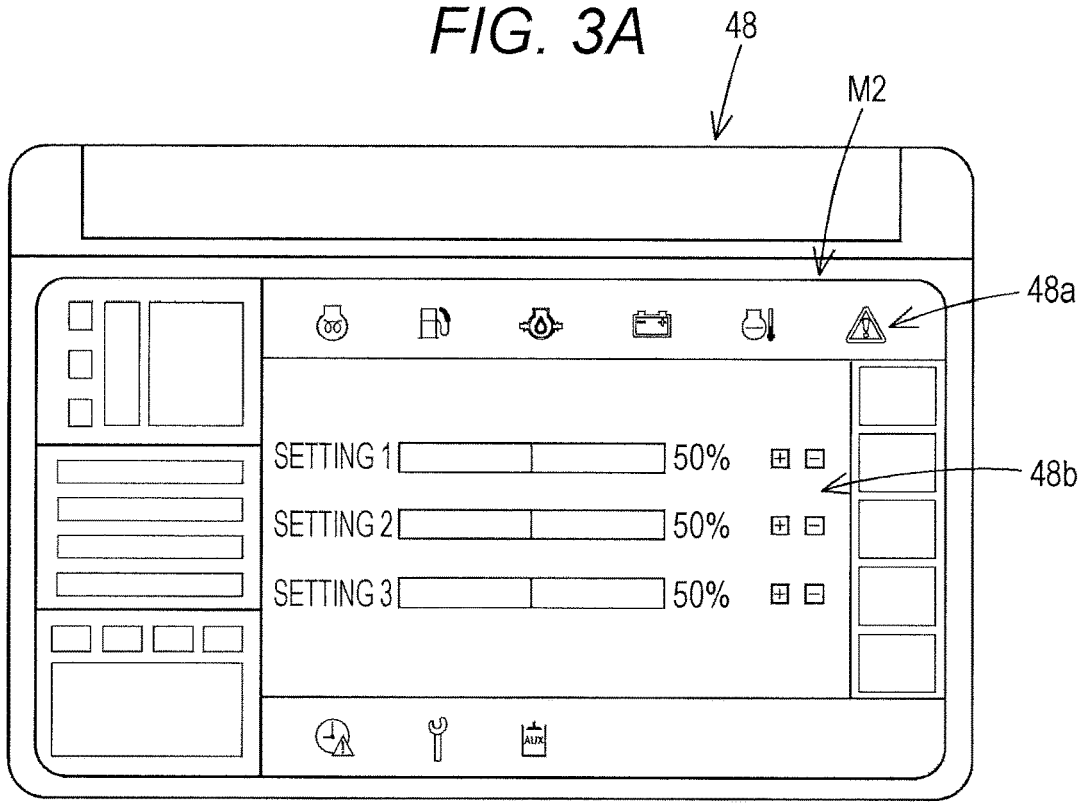
FIG. 3A is a view illustrating one example of a display device.

In addition, the forming machine 10A includes a display device 48. The display device 48 is provided in the traveling vehicle 20. The display device 48 is provided near a driver's seat. The display device 48 is connected to the control device 40 and can exchange signals (data) with the control device 40. The display device 48 is provided with an input interface such as a touch panel and a switch and displays various information items regarding the forming machine 10A on a screen M2. For example, as illustrated in FIG. 3A, the display device 48 displays on the screen M2 icons 48a indicating conditions of the traveling vehicle 20, and displays on the screen M2 a setting part 48b for setting the traveling vehicle 20 or the forming device 30A. Note that information displayed by the display device 48 is not limited to the example described above.

The grass management system includes a prohibition setting unit 50A configured to set prohibited positions at which discharge of the formed material K1 is prohibited. The prohibition setting unit 50A is provided in a support device 55. The support device 55 is, for example, a device such as a personal computer owned by an administrator who manages grass. Note that the support device 55 may be a portable terminal such as a smartphone, a tablet, a personal digital assistant (PDA), or may be a server or the like.

The support device 55 includes a calculator 55a including a central processing unit (CPU) or the like, a display unit 55b, and a storage unit 55c including a nonvolatile memory or the like. In addition, the support device 55 includes a connection unit that can connect the external instrument 28. The display unit 55b is a device that performs various types of display and includes a liquid crystal panel or the like. The prohibition setting unit 50A includes electric and electronic components provided in the support device 55, programs incorporated in the calculator 55a (support device 55), and the like.

Figure 4A:
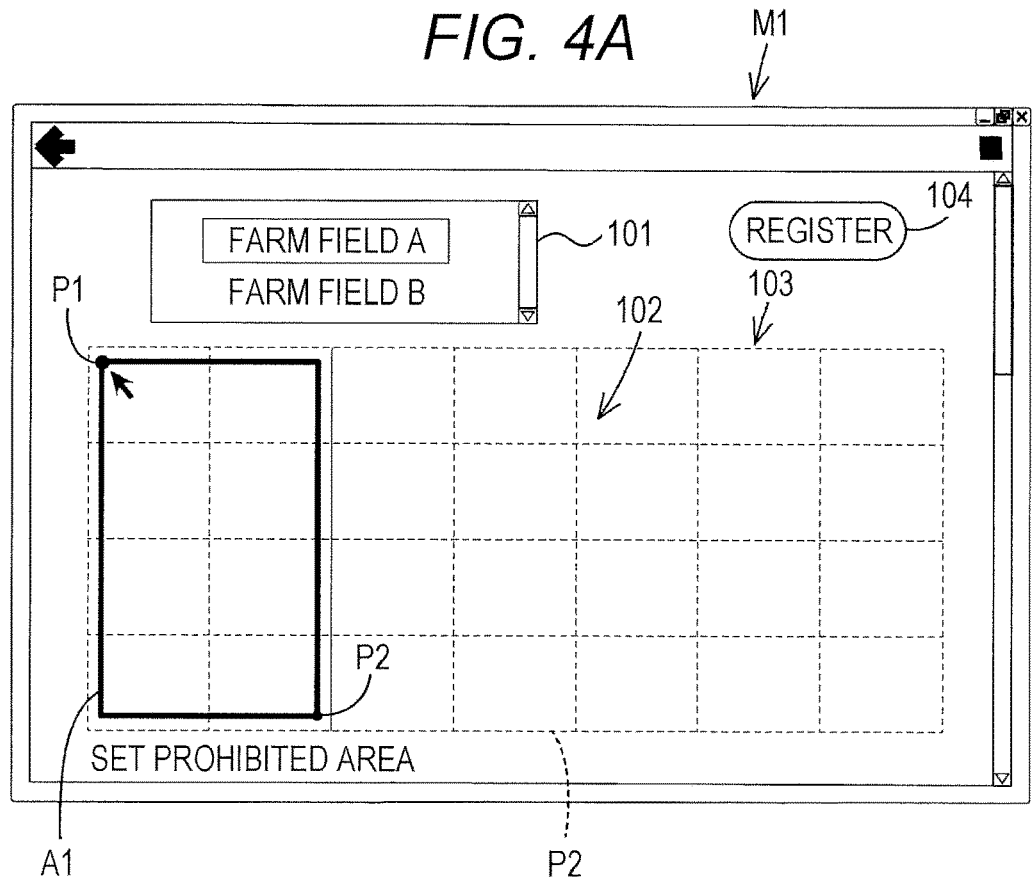
FIG. 4A is a view illustrating a setting screen M1.

As illustrated in FIG. 4A, when the administrator or the like operates the support device 55, the prohibition setting unit 50A causes the display unit 55b of the support device 55 to display a setting screen M1. The setting screen M1 includes a setting part 101 for setting a farm field, and a farm field display part 103 that displays fields 102 indicating the farm field. In the setting part 101, it is possible to select identification information such as a farm field name corresponding to a farm field registered in advance by the administrator or the like in the support device 55, and a farm field code indicating the farm field. In the farm field display part 103, the fields 102 corresponding to the identification information selected in the setting part 101 (farm field name, farm field code) are displayed.

A position of the farm field (latitude, longitude) is associated with the fields 102. For example, position information indicating the position of the farm field has been stored in advance in the storage unit 55c of the support device 55. When displaying the fields 102 in the farm field display part 103, the prohibition setting unit 50A refers to the storage unit 55c and causes the position corresponding to the identification information indicated in the setting part 101 to be associated with the fields 102. Alternatively, after displaying the fields 102 in the farm field display part 103, the prohibition setting unit 50A requests the administrator or the like to input information including latitude and longitude about an arbitrary point in the fields 102 (reference position). Based on the position (latitude, longitude) with respect to the reference position input by the administrator using an input interface (mouse, keyboard, or the like), the prohibition setting unit 50A then assigns latitude and longitude to all points on the fields 102.

Figure 4B:
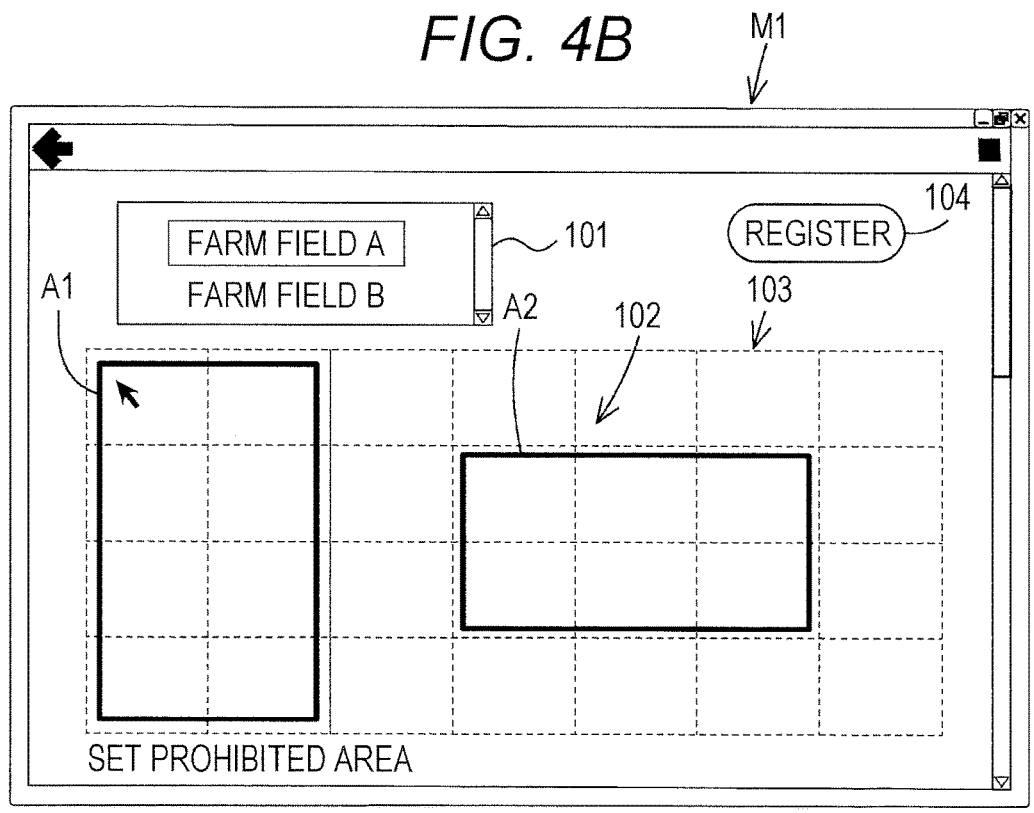
FIG. 4B is a view in which a plurality of prohibited areas is set in the setting screen M1.

The prohibited positions at which discharge of the formed material K1 is prohibited can be set in the fields 102. For example, when the administrator selects a predetermined range A1 on the fields 102 by using the input interface of the support device 55 and then selects a registration button 104 displayed on the setting screen M1, the prohibition setting unit 50A sets the predetermined range A1 on the fields 102 as a prohibited area that prohibits discharge of the formed material K1. For example, as illustrated in FIG. 4A, when a position P1 and a position P2 are selected on the fields 102, the prohibition setting unit 50A sets, as the prohibited positions, all positions contained in the prohibited area A1 surrounding a diagonal line connecting the position P1 and the position P2. On the setting screen M1, as illustrated in FIG. 4B, by selecting a plurality of prohibited areas A1 and A2 on the fields 102 by using the input interface, all positions in the plurality of prohibited areas A1 and A2 can be set as the prohibited positions.

Note that a method of setting prohibited positions through selection on the fields 102 is not limited to the example described above. Also, the farm field display part 103 may display an image indicating the farm field in the fields 102 or a map of the farm field, or other information about the farm field may be superimposed and displayed.

FIG. 5 is a diagram illustrating one example of the prohibited positions set by the prohibition setting unit 50A, the positions of the farm field (positions of the fields 102), and the prohibited areas A1. The prohibited positions (prohibited positions illustrated in FIG. 5) set by the setting screen M1 (prohibition setting unit 50A) are stored in the storage unit 55c as prohibition information. Note that the prohibited positions and the identification information identifying the farm field (farm field name, farm field code, and the like) may be stored in the storage unit 55c as the prohibition information. After the prohibited positions are set, by connecting the external instrument 28 such as a USB device to the support device 55, prohibited information stored in the storage unit 55c can be transferred to the external instrument 28.

Therefore, by displaying the fields 102 indicating the farm field in the farm field display part 103 and selecting the prohibited area in the fields 102, an operator or the like can arbitrarily set the prohibited positions.

Here, the forming machine 10A includes a prohibited position acquisition unit. The prohibited position acquisition unit is a device that acquires a prohibited position at which discharge of the formed material K1 is prohibited. In this embodiment, the prohibited position acquisition unit is the input output device 29 to which the external instrument 28 can be connected. When the external instrument 28 storing the prohibition information is connected to the input output device 29, the input output device 29 acquires the prohibition information including the prohibited positions stored in the external instrument 28. The acquired prohibition information is stored in the storage unit 40a provided in the control device 40.

The control device (control unit) 40 performs control based on a relationship between a discharge position (planned discharge position) to discharge the formed material K1 from the discharge unit 37, and the prohibited positions acquired by the prohibited position acquisition unit (input output device 29).

As illustrated in FIG. 1, the forming machine 10A includes a discharge operation unit 43. The discharge operation unit 43 is an operation tool to operate discharge of the formed material K1 by the discharge unit 37, and is, for example, a switch that can be switched between ON and OFF. The discharge operation unit 43 is provided near the driver's seat and can be operated by the operator. When the discharge operation unit 43 is turned ON, a discharge instruction signal is input into the control device 40, and when the discharge operation unit 43 is turned OFF, a discharge stop signal is input into the control device 40. Note that the discharge operation unit 43 may be a switch that can be switched between ON and OFF displayed on the display device 48. The input output device 29 may be provided in the display device 48.

Figure 6:
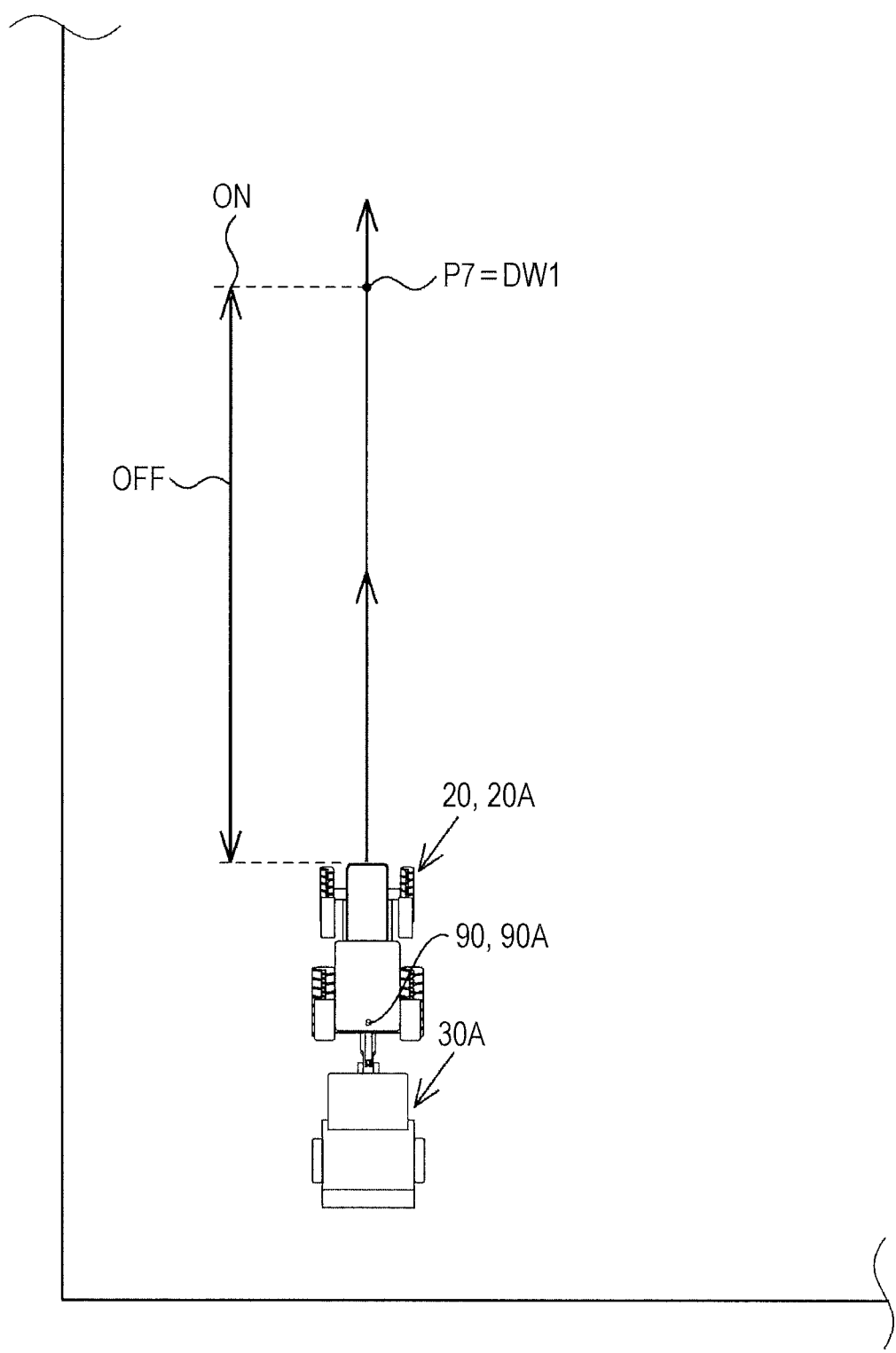
FIG. 6 is a view explaining a discharge position by an operation of a discharge operation unit at the time of forming work.

As illustrated in FIG. 6, at the time of forming work in which the forming machine 10A performs forming while harvesting (collecting) grass on the farm field, when the operator switches the discharge operation unit 43 from OFF to ON, the control device 40 sets a machine position P7 at which the discharge operation unit 43 is turned from OFF to ON as a discharge position DW1 for the formed material K1. Alternatively, the control device 40 may set a position several meters to several tens of meters from the machine position (machine position at the time of switching) P7 at the time when the discharge operation unit 43 is switched from OFF to ON as the discharge position DW1. In other words, a travel distance of the forming machine 10A from when the discharge operation unit 43 is switched from OFF to ON until the formed material K1 is discharged to the farm field may be set in advance, and a position obtained by adding the preset travel distance to the machine position at the time of switching may be set as the discharge position DW1. Note that the setting of the discharge position DW1 described above is one example and is not limited thereto.

At this time, after setting the discharge position DW1, the control device 40 refers to the prohibition information stored in the storage unit 40a and determines whether or not the discharge position DW1 set by the discharge operation unit 43 is set at the prohibited position. That is, the control device 40 determines whether or not the discharge position DW1 and the prohibited position agree with each other.

When the discharge position DW1 and the prohibited position do not agree with each other, the control device 40 permits discharge of the formed material K1, and for example, by outputting a control signal to a switching valve or the like that expands and contracts the oil hydraulic cylinder connected to the second case body 36b, the control device 40 expands the oil hydraulic cylinder and makes the forming device 30A in a gate open state.

Meanwhile, when the discharge position DW1 and the prohibited position agree with each other, the control device 40 does not permit discharge of the formed material K1, maintains the oil hydraulic cylinder in a contracted state, and holds the forming device 30A in a gate closed state. That is, even if the operator switches the discharge operation unit 43 from the OFF state to the ON state, the control device 40 does not shift the forming device 30A to a gate open state.

Therefore, at the time of forming work by the forming machine 10A, discharge of the formed material K1 into the place set as the prohibited position can be prevented.

Figure 3B:
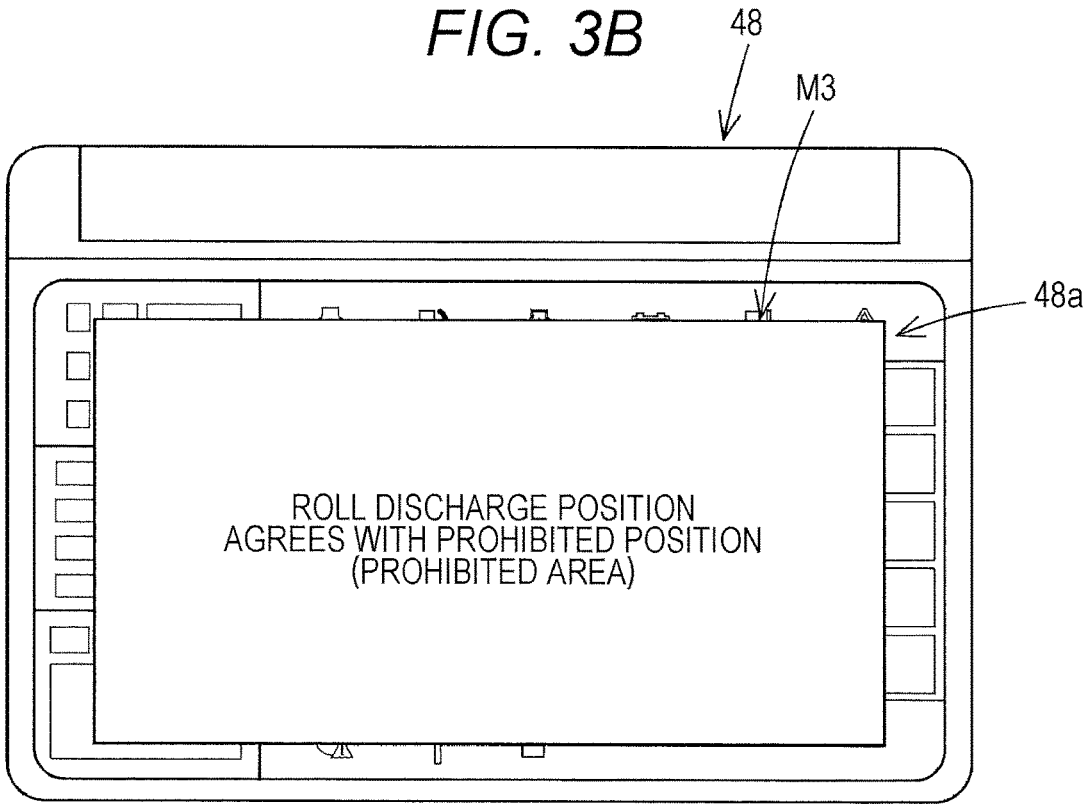
FIG. 3B is an explanatory view explaining a pop-up screen in the display device.

Furthermore, when the discharge position agrees with the prohibited position, the control device 40 outputs, to the display device 48, a control signal indicating that the discharge position agrees with the prohibited position. In response to the control signal (control) from the control device 40, the display device 48 performs display indicating that the discharge position agrees with the prohibited position. For example, as illustrated in FIG. 3B, in a situation where information about the forming machine 10A is displayed on the screen M2, the display device 48 displays a pop-up screen M3 that pops up on the screen M2 displaying the information, and the display device 48 displays an indication that the discharge position and the prohibited position agree with each other on the pop-up screen M3. Note that in the above-described embodiment, the discharge operation unit 43 may be a switch that can be switched between ON and OFF displayed on the display device 48. The input output device 29 may be provided in the display device 48.

Therefore, it is possible not to discharge the formed material K1 when the discharge position DW1 and the prohibited position agree with each other, and it is possible to discharge the formed material K1 only when the discharge position DW1 and the prohibited position do not agree with each other. That is, at the time of forming work by the forming machine 10A, discharge of the formed material K1 into the place set as the prohibited position can be prevented.

Second Embodiment

Figure 7:
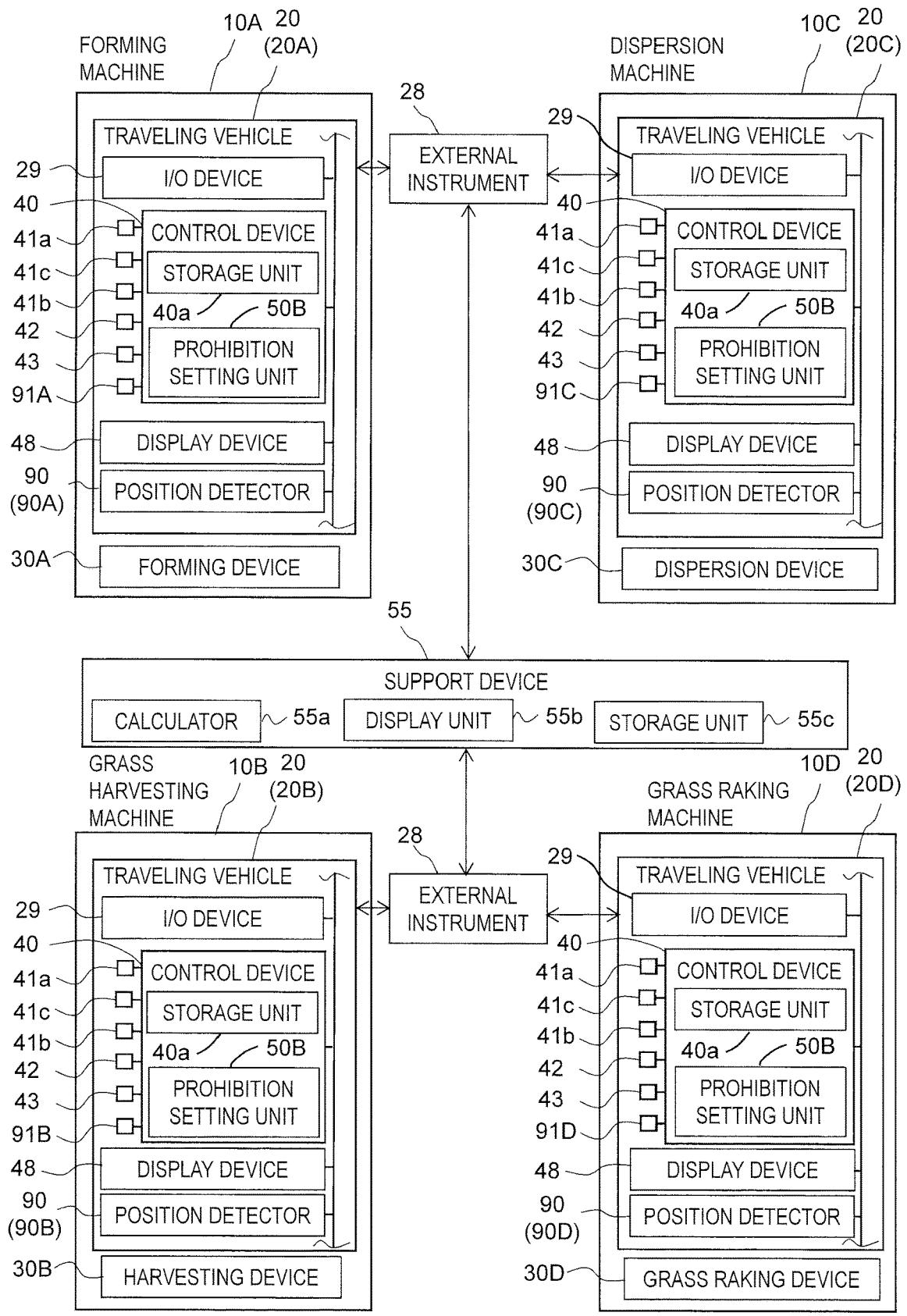
FIG. 7 is an overall diagram of a grass management system in a second embodiment.

FIG. 7 is an overall diagram illustrating a grass management system in a second embodiment. In the second embodiment, a configuration different from the configuration of the embodiment described above will be described. As illustrated in FIG. 7, the grass management system includes a prohibition setting unit 50B configured to set prohibited positions. The prohibition setting unit 50B sets the prohibited positions based on information when a work machine travels.

The work machine is a machine that performs work related to grass. The work machine is, for example, a forming machine 10A, a grass harvesting machine 10B, a dispersion machine 10C, a grass raking machine 10D, and the like. In other words, in the second embodiment, it is possible to set the prohibited positions based on information when any of the forming machine 10A, the grass harvesting machine 10B, the dispersion machine 10C, and the grass raking machine 10D is traveling.

First, an outline of the grass harvesting machine 10B, the dispersion machine 10C, and the grass raking machine 10D will be described.

Figure 8:
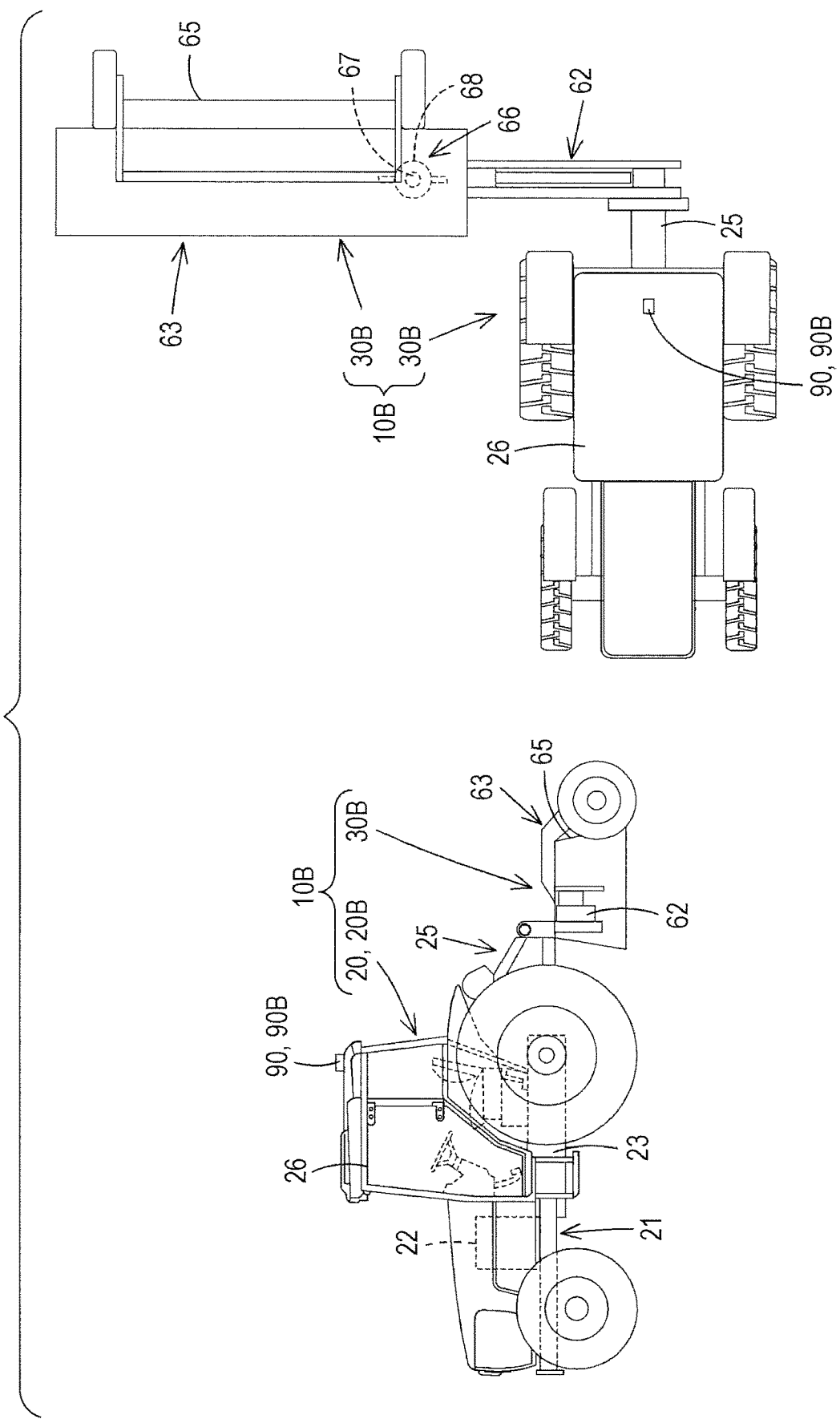
FIG. 8 is a side view and a plan view of an overall grass harvesting machine.

As illustrated in FIG. 8, the grass harvesting machine 10B is a machine configured to harvest grass and includes a traveling vehicle 20 and a harvesting device 30B connected to the traveling vehicle 20. The harvesting device 30B includes a connecting frame 62 connected to a connecting unit 25 of the traveling vehicle 20, and a harvesting unit 63 connected to the connecting frame 62. The harvesting unit 63 includes a gathering unit 65 configured to gather in grass to harvest and a plurality of cutting units 66 configured to cut the grass gathered by the gathering unit 65. Note that FIG. 8 illustrates one cutting unit 66 among the plurality of cutting units 66 included in the harvesting device 30B.

The cutting unit 66 includes a plurality of rotating shafts 67 and a plurality of cutters 68 attached to the rotating shafts 67. The power of the PTO shaft is transmitted to the rotating shafts 67 via a driving shaft supported by the connecting frame 62, thereby rotating the rotating shafts 67. The cutters 68 are disk-shaped cutters, and the adjacently arranged cutters 68 rotate in response to the rotation of the rotating shafts 67, thereby cutting grass. That is, the rotating shafts 67 rotate the cutters 68, which harvest grass, and the harvested grass is discharged outside. Note that the harvesting device 30B is not limited to the above-described configuration and is required at least to harvest grass. For example, the harvesting device 30B may be a hammer knife type configured to harvest grass with knife-shaped cutters 68, or any other type.

Figure 9:
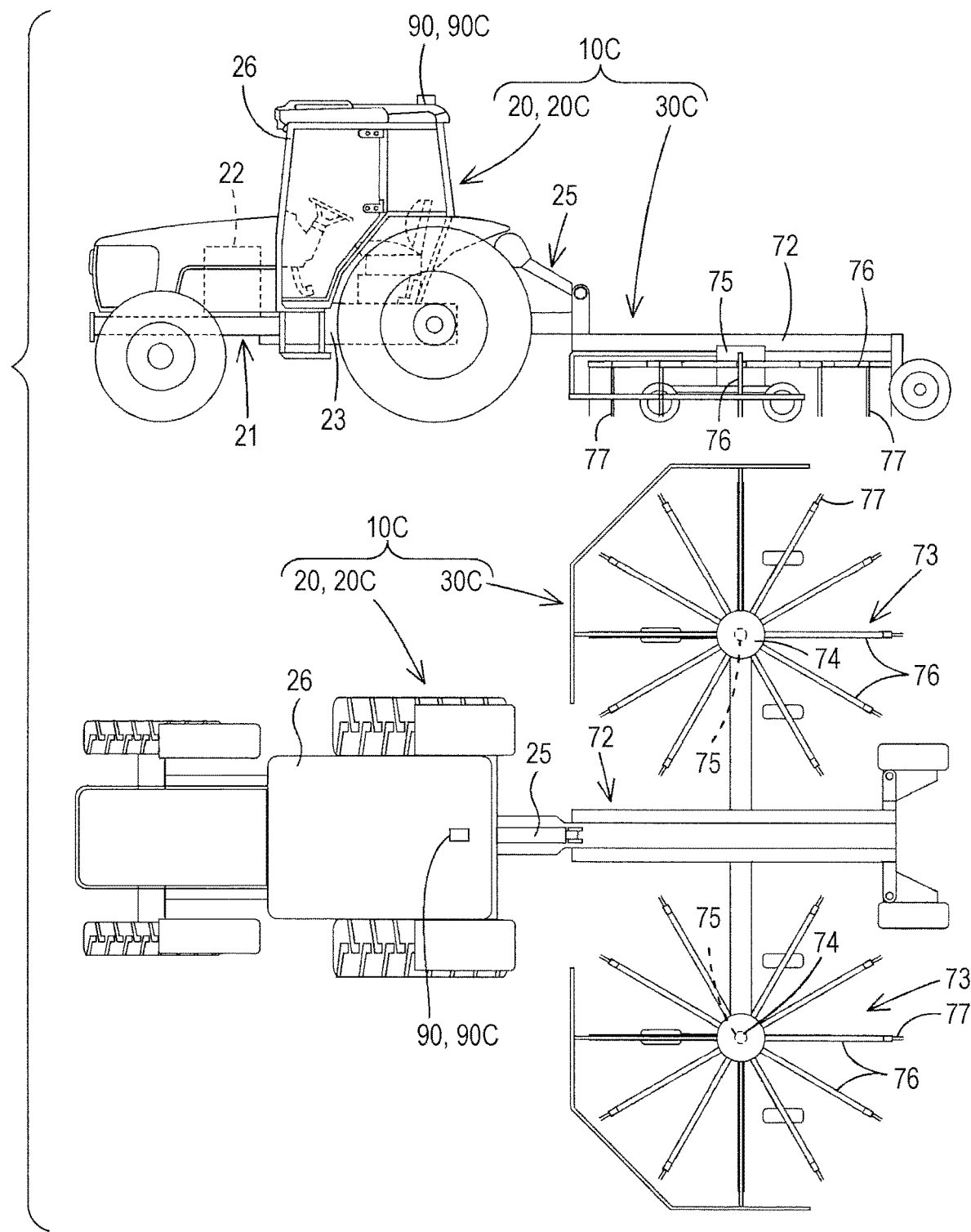
FIG. 9 is a side view and a plan view of an overall dispersion machine.

As illustrated in FIG. 9, the dispersion machine 10C is a machine configured to disperse the harvested grass and includes the traveling vehicle 20 and a dispersion device 30C connected to the traveling vehicle 20. The dispersion device 30C includes a connecting frame 72 connected to the connecting unit 25 of a traveling vehicle 20, and dispersion units 73 connected to the connecting frame 72. Note that FIG. 9 illustrates an example in which two dispersion units 73 are connected to the connecting frame 72.

The dispersion units 73 each include a body 74 connected to the connecting frame 72, a rotating shaft 75 rotatably supported by the body 74, a plurality of arms (tine arms) 76 connected to the rotating shaft 75, and dispersion tools (tines) 77 connected to the plurality of arms 76. The tine 77 is, for example, a member with a distal end divided into two branches. The power of the PTO shaft is transmitted to the rotating shaft 75 via a driving shaft supported by the connecting frame 72, thereby rotating the rotating shaft 75. As the rotating shaft 75 rotates, the arms 76 rotate, and the dispersion tools 77 disperse grass. That is, the rotation of the rotating shaft 75 causes the dispersion tools 77 to rotate, and the dispersion tools 77 disperse grass. Note that the dispersion device 30C is not limited to the above-described configuration and is required at least to disperse grass. For example, one dispersion unit 73, or three or more dispersion units 73 may be provided. Also, the dispersion unit 73 may be a rotary type in which a rotor with the dispersion tools 77 rotates around a longitudinal axis, may be a belt/chain type in which the plurality of dispersion tools 77 is attached to a rotating belt or chain, or may be any other type.

Figure 10:
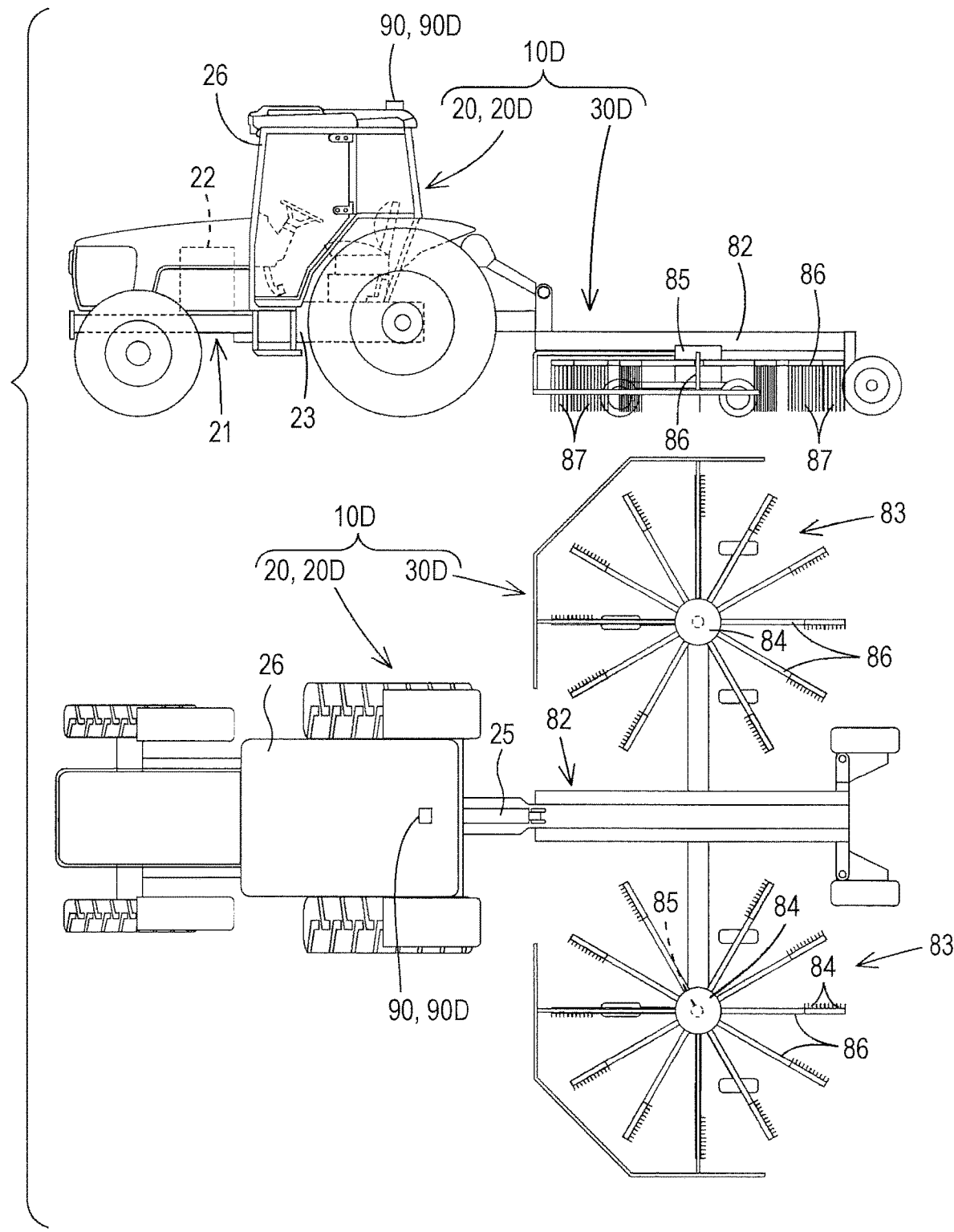
FIG. 10 is a side view and a plan view of an overall grass raking machine.

As illustrated in FIG. 10, the grass raking machine 10D is a machine configured to rake grass and includes the traveling vehicle 20 and a grass raking device 30D connected to the traveling vehicle 20. The grass raking device 30D includes a connecting frame 82 connected to the connecting unit 25 of the traveling vehicle 20, and grass raking units 83 connected to the connecting frame 82. Note that FIG. 10 illustrates an example in which two grass raking units 83 are connected to the connecting frame 82.

The grass raking units 83 each include a body 84 connected to the connecting frame 82, a rotating shaft 85 rotatably supported by the body 84, a plurality of arms (tine arms) 86 connected to the rotating shaft 85, and grass raking tools (tines) 87 connected to the plurality of arms 86. Note that an interval of the grass raking tools 87 in the grass raking device 30D is shorter than in the dispersion tools 77 of the dispersion device 30C. The tine 87 is, for example, a member with a distal end divided into two branches. The power of the PTO shaft is transmitted to the rotating shaft 85 via a driving shaft supported by the connecting frame 82, thereby rotating the rotating shaft 85. As the rotating shaft 85 rotates, the arms 86 rotate, and the grass raking tools 87 rake grass. That is, the rotation of the rotating shaft 85 causes the grass raking tools 87 to rotate, and the grass raking tools 87 rake grass.

Note that the grass raking device 30D is not limited to the above-described configuration and is required at least to rake grass. For example, one grass raking unit 83, or three or more grass raking units 83 may be provided. Also, the grass raking unit 83 may be a rotary type in which a rotor with the grass raking tools 87 rotates around a longitudinal axis, may be a belt/chain type in which the plurality of grass raking tools 87 is attached to a rotating belt or chain, or may be any other type.

Hereinafter, for convenience of description, the traveling vehicle of the forming machine 10A may be referred to as "20A", the traveling vehicle of the grass harvesting machine 10B may be referred to as "traveling vehicle 20B", the traveling vehicle of the dispersion machine 10C may be referred to as "traveling vehicle 20C", and the traveling vehicle of the grass raking machine 10D may be referred to as "traveling vehicle 20D."

Here, as illustrated in FIGS. 8 to 10, the work machines (grass harvesting machine 10B, dispersion machine 10C, grass raking machine 10D) include position detectors 90 (position detector 90B, position detector 90C, position detector 90D).

The position detectors 90B, 90C, and 90D are installed on a top plate of a cabin 26 of the traveling vehicles 20 (traveling vehicles 20B, 20C, 20D). Note that although the position detectors 90B, 90C, and 90D are installed on the top plate of the cabin 26, an installation place in the traveling vehicle 20 is not limited and may be any other place.

The position detectors 90B, 90C, and 90D are position detection devices configured to detect positions of the position detectors 90B, 90C, and 90D (positioning information including latitude and longitude) with a satellite positioning system. That is, the position detectors 90B, 90C, and 90D each receive a signal transmitted from a positioning satellite (position of the positioning satellite, transmission time, correction information, and the like) and detect the position (for example, latitude and longitude) based on the received signal.

Thus, providing the position detectors 90B, 90C, and 90D in the grass harvesting machine 10B, the dispersion machine 10C, and the grass raking machine 10D, respectively allows individual detection of positions at the time of work (at the time of traveling) related to grass (machine positions at the time of harvesting work, machine positions at the time of dispersion work, machine positions at the time of grass raking work). The machine positions at the time of harvesting work are stored in the storage unit 40a provided in the traveling vehicle 20B. The machine positions at the time of dispersion work are stored in the storage unit 40a provided in the traveling vehicle 20C. The machine positions at the time of grass raking work are stored in the storage unit 40*a* provided in the traveling vehicle 20D.

As illustrated in FIG. 7, the work machines (forming machine 10A, grass harvesting machine 10B, dispersion machine 10C, grass raking machine 10D) include operation units 91 (operation unit 91A, operation unit 91B, operation unit 91C, operation unit 91D). The operation units 91A, 91B, 91C, and 91D are each a switch that instructs prohibition of discharge of a formed material K1. The operation units 91A, 91B, 91C, and 91D are each a switch that can be switched between ON and OFF, and connected to the control device 40. When the switch is ON, the operation units 91A, 91B, 91C, and 91D each output, to the control device 40, a prohibition signal instructing prohibition of discharge, and when the switch is OFF, the operation units 91A, 91B, 91C, and 91D each output, to the control device 40, a permission signal permitting discharge. The operation units 91A, 91B, 91C, and 91D are provided near driver's seats of the traveling vehicles 20A, 20B, 20C, and 20D, respectively and can be operated by an operator. That is, at the time of work (at the time of traveling) related to grass by the work machine, when the operator checks a condition of a farm field and turns ON the operation unit 91 upon reaching a position unsuitable for discharging the formed material K1, the prohibited position can be set.

The prohibition setting unit 50B sets the prohibited positions based on information when the work machine travels (machine positions) and operations of the operation units 91A, 91B, 91C, and 91D. The prohibition setting unit 50B includes electric and electronic components provided in the control device 40, programs incorporated in the control device 40, and the like.

Figure 11:
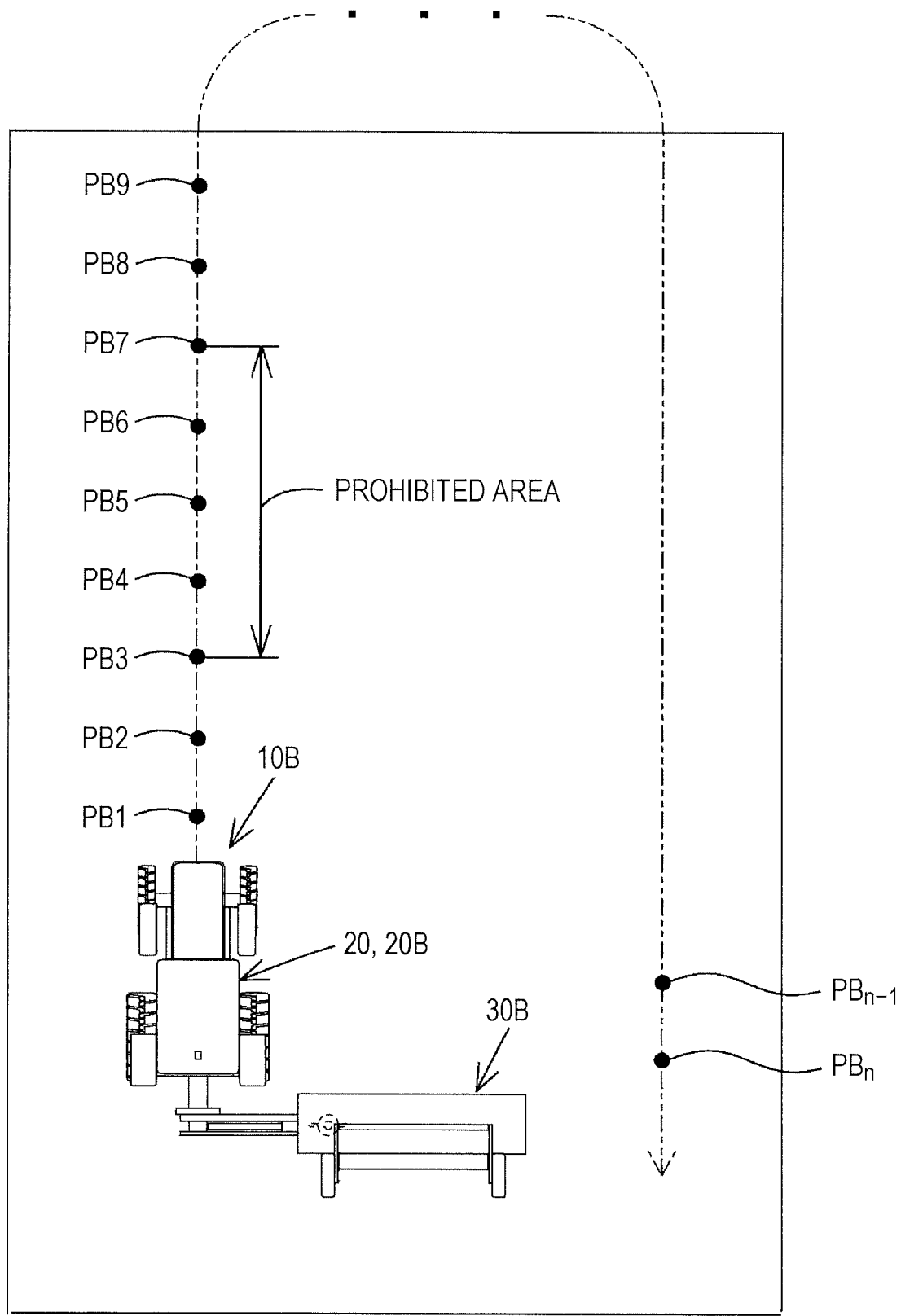
FIG. 11 is a view explaining setting of prohibited positions by an operation unit at the time of harvesting work.

As illustrated in FIG. 11, at the time of harvesting work by the grass harvesting machine 10B, the position detector 90B detects machine positions at the time of harvesting work PBn (n=1, 2, 3, . . . n). For example, at the time of harvesting work by the grass harvesting machine 10B, when the operation unit 91B is turned ON at the machine position PB3 and the control device 40 acquires the prohibition signal, the prohibition setting unit 50B holds the machine position PB3 when the operation unit 91B is turned ON. Also, at the time of harvesting work, when the operation unit 91B changes from ON to OFF at the machine position PB7, the prohibition setting unit 50B holds the machine position PB7 when the operation unit 91B changes from ON to OFF. Then, the prohibition setting unit 50B sets, as a prohibited area, the machine positions while the operation unit 91B is ON at the time of harvesting work, that is, a range from the machine position PB3 to the machine position PB7 in FIG. 11. Meanwhile, in a state where the operation unit 91B is maintained OFF (state where the control device 40 has acquired the permission signal), the prohibition setting unit 50B does not set the machine positions at the time of harvesting work PBn as the prohibited positions.

Furthermore, at the time of dispersion work by the dispersion machine 10C, the position detector 90C detects the machine positions at the time of dispersion work PCn (n=1, 2, 3, . . . n). The prohibition setting unit 50B sets, as the prohibited positions, the machine positions PCn while the operation unit 91C is ON at the time of dispersion work. The prohibition setting unit 50B does not set, as the prohibited positions, the machine positions PCn while the operation unit 91C is OFF.

Furthermore, at the time of grass raking work by the grass raking machine 10D, the position detector 90D detects the machine positions at the time of grass raking work PDn (n=1, 2, 3, . . . n). The prohibition setting unit 50B sets, as the prohibited positions, the machine positions PDn while the operation unit 91D is ON at the time of grass raking work. The prohibition setting unit 50B does not set, as the prohibited positions, the machine positions PDn while the operation unit 91D is OFF.

As described above, in the work (harvesting work, dispersion work, grass raking work, and the like) before the forming work by the forming machine 10A, by checking the condition of the farm field and turning ON the operation unit 91 upon reaching a position unsuitable for discharging the formed material K1, the operator can set the prohibited positions.

This embodiment allows setting the prohibited positions in all work in the harvesting work, the dispersion work, and the grass raking work, but of course is not limited thereto. It is required at least to set the prohibited positions in any of the harvesting work, the dispersion work, and the grass raking work. The harvesting work, the dispersion work, and the grass raking work have been exemplified as the work related to grass, but the work related to grass is not limited thereto and may be performed at the time of fertilization work or any other work. When such work is performed in the fertilization work, the prohibited positions can be set by providing a fertilizing machine with the position detector 90, the operation unit 91, and the prohibition setting unit 50B.

In addition, the prohibited positions may also be set at the time of forming work by the forming machine 10A. At the time of forming work by the forming machine 10A, the position detector 90A detects the machine positions at the time of forming work PAn (n=1, 2, 3, . . . n). At the time of forming work by the forming machine 10A, for example, when the operator checks the condition of the farm field and determines that the farm field is unsuitable for discharging the formed material K1, the prohibited positions can be set by turning ON the operation unit 91A.

As described above, in any of the forming machine 10A, the grass harvesting machine 10B, the dispersion machine 10C, the grass raking machine 10D, and the fertilizing machine, the prohibited positions are stored as prohibition information in the storage unit 40*a* of the control device 40 provided in each traveling vehicle 20. The prohibition information including the prohibited positions can be transferred from the storage unit 40*a* to the external instrument 28 by connecting the external instrument 28 to the input output device 29 provided in the traveling vehicle 20. Also, by connecting the external instrument 28 to the support device 55, the prohibition information stored in the external instrument 28 can be transferred to the storage unit 55*c* of the support device 55.

Although the embodiment described above has described the example in which the prohibition setting unit 50B is provided in the control device 40, the prohibition setting unit 50B may be provided in the support device 55. In this case, the prohibition setting unit 50B includes a program and the like incorporated in a calculator 55*a* (support device 55) and the like.

In this case, in any of the forming machine 10A, the grass harvesting machine 10B, the dispersion machine 10C, the grass raking machine 10D, and the fertilizing machine, at the time of work (at the time of traveling), the control device 40 associates discharge setting information indicating ON/OFF of the operation unit 91 (prohibition signal, permission signal) with the machine positions detected by the position detector 90, and stores the associated information in the storage unit 40*a* as the prohibition information. Also, when the external instrument 28 is connected to the input output device 29 of the traveling vehicle 20, the prohibition information (discharge setting information and machine positions) stored in the storage unit 40a is transferred to the external instrument 28. When the external instrument 28 is connected to the support device 55, the prohibition information (discharge setting information and machine positions) is transferred to the support device 55.

Also, when an administrator performs a predetermined operation on the support device 55 and setting of the prohibited positions is requested, the prohibition setting unit 50B of the support device 55 sets the prohibited positions based on the discharge setting information and the machine positions. A method of setting the prohibited positions by the prohibition setting unit 50B is similar to the above-described method. When the prohibited positions are set by the prohibition setting unit 50B of the support device 55, the set prohibited positions are stored in the storage unit 55c.

Third Embodiment

Figure 12:
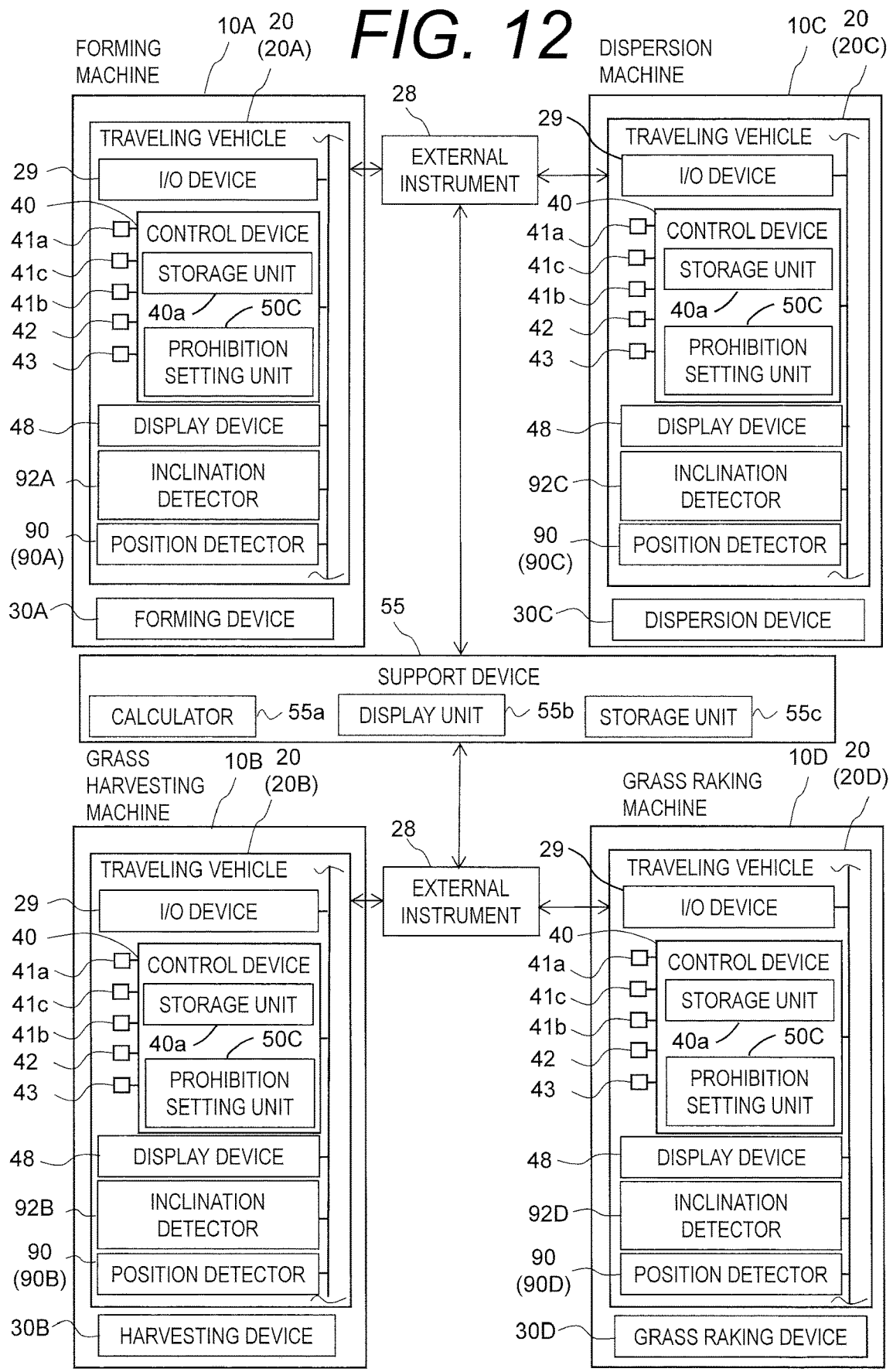
FIG. 12 is an overall diagram of a grass management system in a third embodiment.

FIG. 12 is an overall diagram illustrating a grass management system in a third embodiment. In the third embodiment, a configuration different from the configuration of the embodiments described above will be described. As illustrated in FIG. 12, the grass management system includes a prohibition setting unit 50C configured to set prohibited positions. The prohibition setting unit 50C sets the prohibited positions based on information when a work machine travels.

As illustrated in FIG. 12, the work machines (forming machine 10A, grass harvesting machine 10B, dispersion machine 10C, grass raking machine 10D) include inclination detectors 92 (inclination detector 92A, inclination detector 92B, inclination detector 92C, inclination detector 92D). The inclination detectors 92 are inertial devices that can detect an inclination when the work machines travel.

The inclination detectors 92 are sensors that can detect acceleration, angular velocity, and the like, and are acceleration sensors, gyro sensors, or the like. The inclination detectors 92A, 92B, 92C, and 92D are provided in traveling vehicles 20A, 20B, 20C, and 20D, respectively, and are connected to control devices 40. The control devices 40 can acquire the acceleration, the angular velocity, and the like detected by the inclination detectors 92A, 92B, 92C, and 92D, and can detect the inclinations of the traveling vehicles 20A, 20B, 20C, and 20D respectively from the acquired acceleration and the angular velocity. Note that the inclination detectors 92A, 92B, 92C, and 92D may be provided in a forming device 30A, a harvesting device 30B, a dispersion device 30C, and a grass raking device 30D, respectively. The control devices 40 may obtain the respective inclinations of the forming device 30A, the harvesting device 30B, the dispersion device 30C, and the grass raking device 30D.

The prohibition setting unit 50C sets the prohibited positions based on information when the work machine travels (machine positions, inclination). The prohibition setting unit 50C includes electric and electronic components provided in the control device 40, programs incorporated in the control device 40, and the like.

Figure 13:
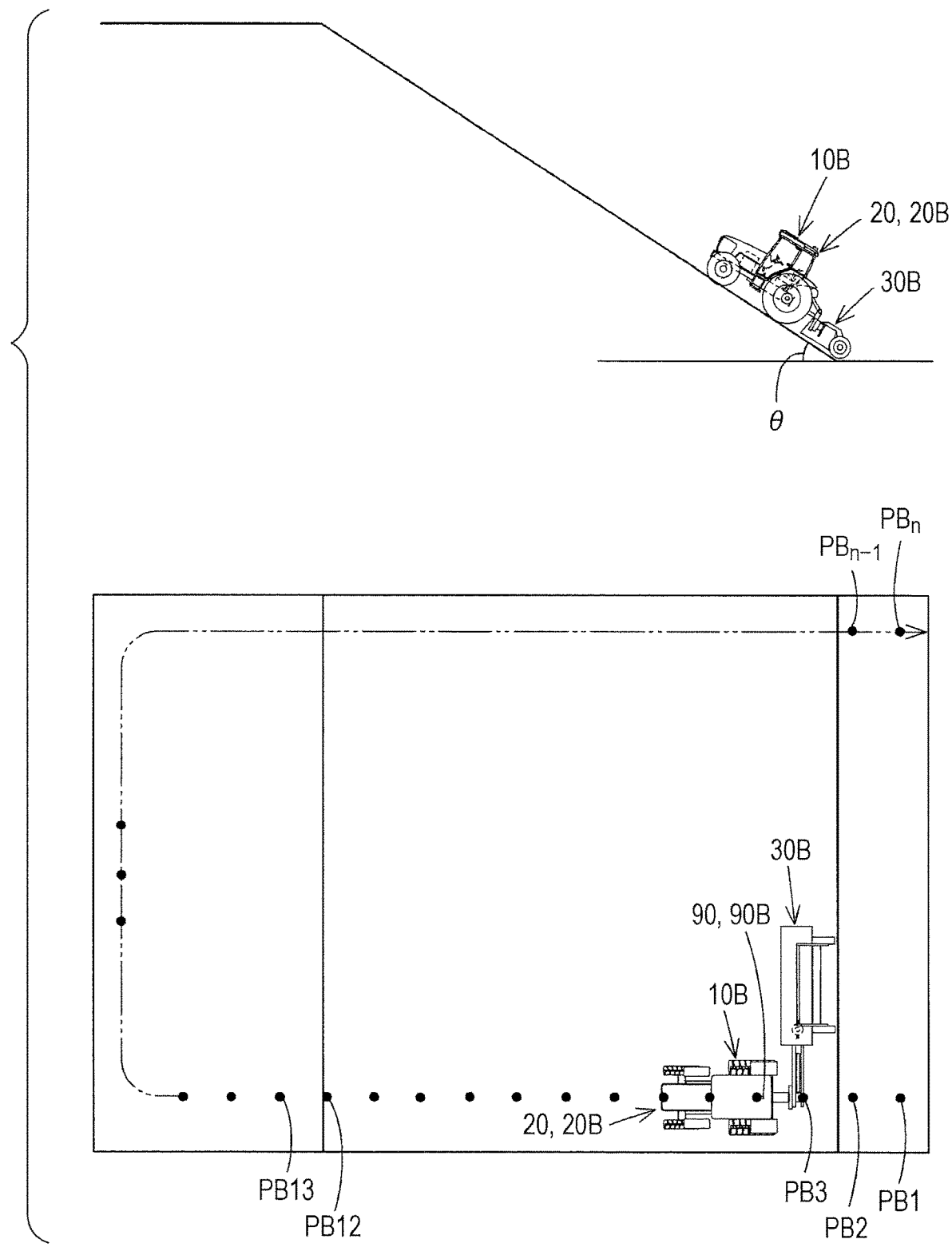
FIG. 13 is a view illustrating a relationship between an inclination θ of a traveling vehicle and prohibited positions.

At the time of harvesting work by the grass harvesting machine 10B, a position detector 90B detects machine positions at the time of harvesting work PBn. As illustrated in FIG. 13, the prohibition setting unit 50C of the traveling vehicle 20B sequentially determines the inclination $\theta$ of a running direction (traveling direction) of the traveling vehicle 20B (inclination $\theta$ of the traveling vehicle with respect to a horizontal direction) by using acceleration, angular velocity, and the like detected by the inclination detector 92B. For example, at the time of harvesting work by the grass harvesting machine 10B, when the inclination $\theta$ at the machine position PBn is equal to or greater than a predetermined threshold (inclination determination value), the prohibition setting unit 50C holds the machine position PBn when the inclination $\theta$ of the traveling vehicle 20B becomes equal to or greater than the threshold. Furthermore, at the time of harvesting work, when the inclination $\theta$ at the machine position PBn changes from equal to or greater than the threshold to less than the threshold, the prohibition setting unit 50C holds the machine position PBn when the inclination $\theta$ of the traveling vehicle 20B changes to less than the threshold. For example, as illustrated in FIG. 13, when the inclination $\theta$ becomes equal to or greater than the threshold at the machine position PB3 and the inclination $\theta$ becomes less than the threshold at the machine position PB13, the prohibition setting unit 50C sets the machine positions from the machine position PB3 to the machine position PB12 as the prohibited positions. Meanwhile, when the inclination $\theta$ of the traveling vehicle 20B is less than the threshold, the machine positions are not set as the prohibited positions.

Furthermore, at the time of dispersion work by the dispersion machine 10C, a position detector 90C detects machine positions at the time of dispersion work PCn. The prohibition setting unit 50C of the traveling vehicle 20C sequentially determines the inclination $\theta$ of a running direction of the traveling vehicle 20C by using acceleration, angular velocity, and the like detected by the inclination detector 92C. At the time of dispersion work by the dispersion machine 10C, the prohibition setting unit 50C sets, as the prohibited positions, the machine positions PCn when the inclination $\theta$ of the traveling vehicle 20C becomes equal to or greater than the threshold, and does not set the machine positions as the prohibited positions when the inclination $\theta$ of the traveling vehicle 20C is less than the threshold.

Furthermore, at the time of grass raking work by the grass raking machine 10D, the position detector 90C detects the machine positions at the time of grass raking work PDn. The prohibition setting unit 50C of the traveling vehicle 20D sequentially determines the inclination $\theta$ of a running direction of the traveling vehicle 20D by using acceleration, angular velocity, and the like detected by the inclination detector 92D. At the time of grass raking work by the grass raking machine 10D, the prohibition setting unit 50C sets, as the prohibited positions, the machine positions PDn when the inclination $\theta$ of the traveling vehicle 20D becomes equal to or greater than the threshold, and does not set the machine positions as the prohibited positions when the inclination $\theta$ of the traveling vehicle 20D is less than the threshold.

Note that the threshold (inclination determination value) is set at an angle at which, when a formed material K1 is discharged, at least the roll-shaped formed material K1 does not roll and move. It is preferable to set the angle at which the formed material K1 does not roll and move by past actual results, simulation, or the like.

As described above, it is possible to set the prohibited positions according to the inclinations of the traveling vehicles 20B, 20C, and 20D in the work before the forming work by the forming machine 10A (harvesting work, dispersion work, grass raking work, and the like). This embodiment allows setting the prohibited positions in all work in the harvesting work, the dispersion work, and the grass raking work, but of course is not limited thereto. It is required at least to set the prohibited positions in any of the harvesting work, the dispersion work, and the grass raking work. The harvesting work, the dispersion work, and the grass raking work have been exemplified as the work related to grass, but the work related to grass is not limited thereto and may be performed at the time of fertilization work or any other work. When such work is performed in the fertilization work, the prohibited positions can be set by providing a fertilizing machine with the position detector 90, the inclination detector 92, and the prohibition setting unit 50C.

In addition, the prohibited positions may also be set at the time of forming work by the forming machine 10A. At the time of forming work by the forming machine 10A, the position detector 90A detects the machine positions at the time of forming work PAn. At the time of forming work by the forming machine 10A, the prohibition setting unit 50C sequentially determines the inclination θ of a running direction of the traveling vehicle 20A by using acceleration, angular velocity, and the like detected by the inclination detector 92A. At the time of forming work by the forming machine 10A, the prohibition setting unit 50C sets, as the prohibited positions, the machine positions PAn when the inclination θ of the traveling vehicle 20A becomes equal to or greater than the threshold, and does not set machine positions as the prohibited positions when the inclination θ of the traveling vehicle 20A is less than the threshold.

In any of the forming machine 10A, the grass harvesting machine 10B, the dispersion machine 10C, the grass raking machine 10D, and the fertilizing machine, the prohibited positions are stored in the storage unit 40a of the control device 40 provided in each traveling vehicle 20. As in the above-described embodiments, the prohibited positions stored in the storage unit 40a can be transferred to the support device 55 via an external instrument 28.

Although the embodiments described above have described examples in which the prohibition setting unit 50C is provided in the control device 40, the prohibition setting unit 50C may be provided in the support device 55. In this case, the prohibition setting unit 50C includes a program or the like incorporated in a calculator 55a (support device 55) and the like.

In any of the forming machine 10A, the grass harvesting machine 10B, the dispersion machine 10C, the grass raking machine 10D, and the fertilizing machine, at the time of work (at the time of traveling), the control device 40 associates inclination information on the inclination of the traveling vehicle 20 [detection information detected by the inclination detector 92 (acceleration, angular velocity), or inclination θ of the traveling vehicle 20 determined from the acceleration, angular velocity, or the like] with the machine positions detected by the position detector 90, and then the control device 40 stores the associated information in the storage unit 40a. Also, when the external instrument 28 is connected to an input output device 29 of the traveling vehicle 20, the control device 40 transfers the inclination information and the machine positions stored in the storage unit 40a to the external instrument 28. When the external instrument 28 is connected to the support device 55, the inclination information and the machine positions are transferred to the support device 55.

Also, when an administrator performs a predetermined operation on the support device 55 and setting of the prohibited positions is requested, the prohibition setting unit 50C of the support device 55 sets the prohibited positions based on the inclination information and the machine positions. A method of setting the prohibited positions by the prohibition setting unit 50C is similar to the above-described method. When the prohibited positions are set by the prohibition setting unit 50C of the support device 55, the set prohibited positions are stored in the storage unit 55c.

Fourth Embodiment

Figure 14:
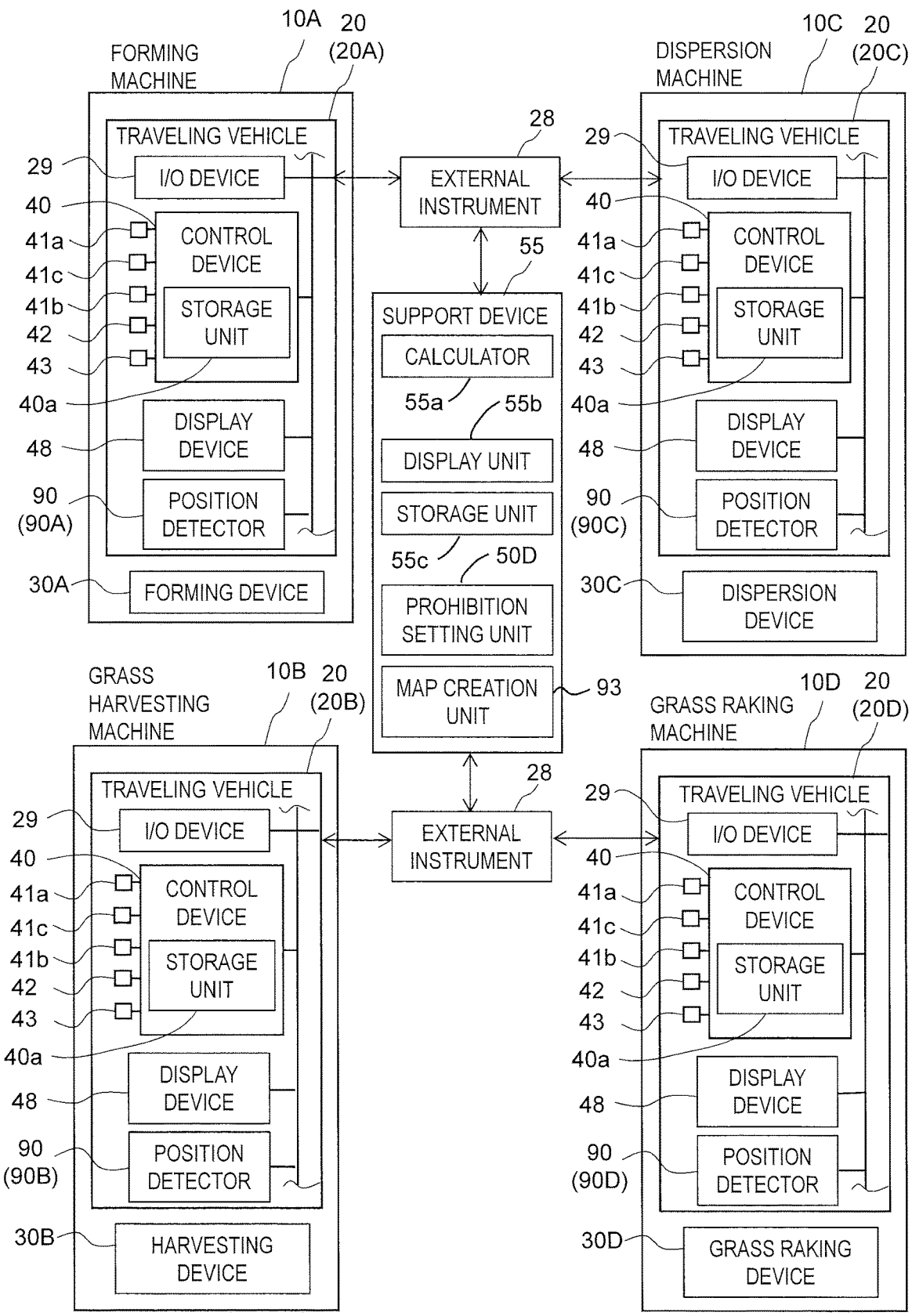
FIG. 14 is an overall diagram of a grass management system in a fourth embodiment.

FIG. 14 is an overall diagram illustrating a grass management system in a fourth embodiment. In the fourth embodiment, a configuration different from the configuration of the embodiments described above will be described. As illustrated in FIG. 14, the grass management system includes a prohibition setting unit 50D configured to set prohibited positions.

As illustrated in FIG. 14, the grass management system includes a topographical information detector. The topographical information detector is a device configured to acquire topographical information of a farm field. The topographical information detector acquires height information of the farm field detected at the time of forming work by a forming machine 10A as the topographical information. Specifically, the topographical information detector is a position detector 90A provided in the forming machine 10A. As described above, the position detector 90A detects not only positions (latitude, longitude) but also height (height information) in a vertical direction (height direction) on the basis of a signal transmitted from a positioning satellite at the time of forming work. The latitude and longitude detected by the position detector 90A are two-dimensional information (X-axis direction and Y-axis direction), and the height information is three-dimensional information in the vertical direction (Z-axis direction) of the farm field, which is detected by the position detector 90A and can be used as the topographical information of the farm field. For example, ups and downs of a farm field, that is, a topographical state of the farm field can be detected by a change in a height (change in the Z-axis direction) at the time of forming work.

Also, the topographical information detector may be a device configured to acquire the height information of the farm field detected at the time of harvesting work by a grass harvesting machine 10B as the topographical information. For example, the topographical information detector is a position detector 90B provided in the grass harvesting machine 10B.

Also, the topographical information detector may be a device configured to acquire the height information of the farm field detected at the time of dispersion work by a dispersion machine 10C as the topographical information. For example, the topographical information detector is a position detector 90C provided in the dispersion machine 10C.

Also, the topographical information detector may be a device configured to acquire the height information of the farm field detected at the time of grass raking work by a grass raking machine 10D as the topographical information. For example, the topographical information detector is a position detector 90D provided in the grass raking machine 10D.

Note that the topographical information detector is required at least to be a device that acquires the topographical information of the farm field. The topographical information detector is not limited to the position detector 90A, the position detector 90B, the position detector 90C, or the position detector 90D. For example, an imaging device such as a camera (topographical information detector) may be provided in a multicopter, and an image obtained by the imaging device may be used as the topographical information. Alternatively, the topographical information detector including the position detector 90 capable of detecting height may be provided in a fertilizing machine that fertilizes in the farm field, a spraying machine that sprays a medicine, or the like. In any of the forming machine 10A, the grass harvesting machine 10B, the dispersion machine 10C, the grass raking machine 10D, the fertilizing machine, and the multicopter, the topographical information can be transferred to a support device 55 via an external instrument 28.

Figure 15:
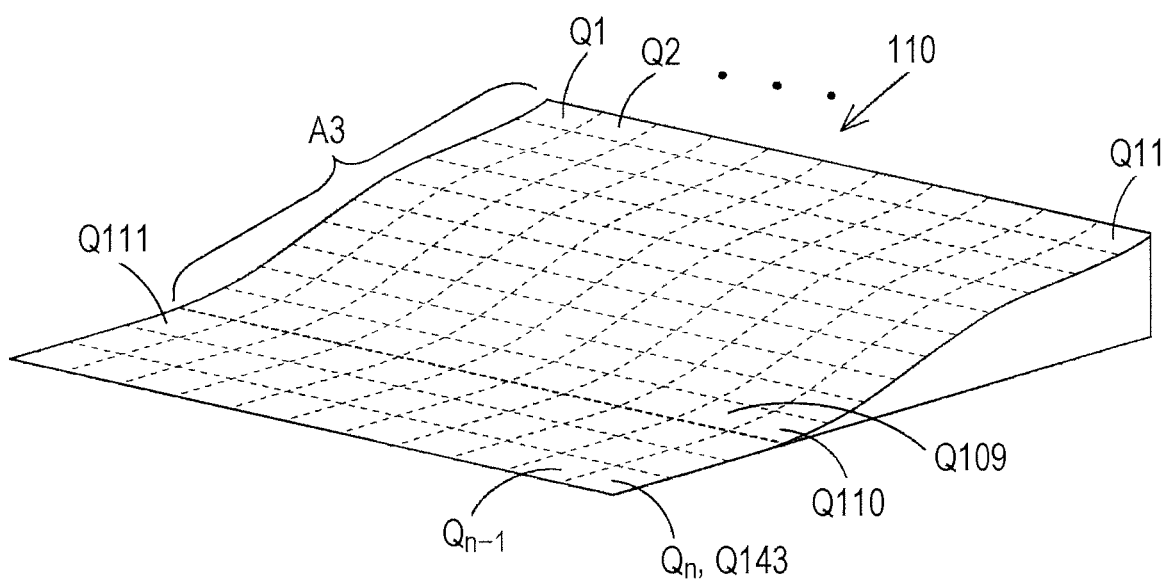
FIG. 15 is a diagram illustrating an inclination map (farm field map).

The grass management system includes a prohibition setting unit 50D and a map creation unit 93. The prohibition setting unit 50D and the map creation unit 93 each include a program or the like incorporated in a calculator 55a (support device 55) and the like. When the topographical information (longitude, latitude, height) is input into the support device 55, as illustrated in FIG. 15, the map creation unit 93 creates a three-dimensional inclination map (farm field map) 110 indicating ups and downs of the farm field based on the topographical information. The map creation unit 93 creates the inclination map 110 by constructing a plurality of mesh parts (polygons) Qn [n=1, 2, 3, ... ]. In the plurality of mesh parts Qn, positions (longitude, latitude) and angles (inclination angles) of a mesh part 110a are associated with each other.

The prohibition setting unit 50D sets the positions of the farm field at which the inclination indicated in the inclination map 110 is equal to or greater than a threshold as the prohibited positions. For example, when the inclination angles in the mesh parts Q1 to Q110 are equal to or greater than the threshold, the prohibition setting unit 50D sets the positions of the farm field corresponding to the mesh parts Q1 to Q110 as the prohibited positions. In other words, the prohibition setting unit 50D sets all the positions included in a prohibited area A3 including the mesh parts Q1 to Q110 as the prohibited positions. Meanwhile, for example, when the inclination angles in the mesh parts Q111 to Q143 are less than the threshold, the prohibition setting unit 50D does not set the positions of the farm field corresponding to the mesh parts Q111 to Q143 as the prohibited positions. Note that the inclination map (farm field map) 110 created by the map creation unit 93 may be displayed on a display unit 55b of the support device 55.

As described above, the support device 55 can create the inclination map 110 of the farm field based on the topographical information, and the prohibition setting unit 50D can set the prohibited positions when the inclination angles of the farm field indicated in the inclination map 110 are equal to or greater than the threshold.

Fifth Embodiment

Figure 16:
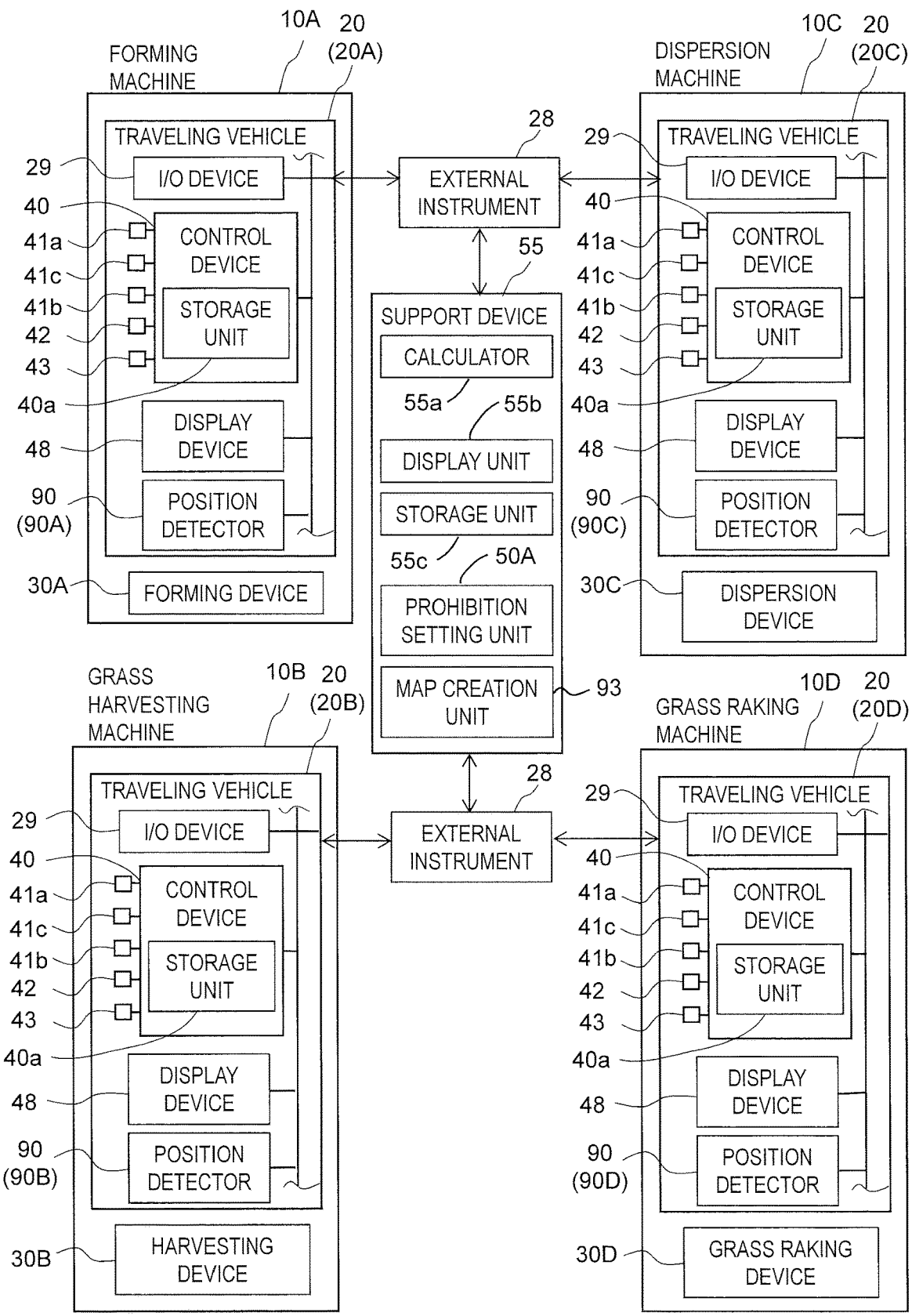
FIG. 16 is an overall diagram of a grass management system in a fifth embodiment.

FIG. 16 is an overall diagram illustrating a grass management system in a fifth embodiment. In the fifth embodiment, a configuration different from the configuration of the embodiments described above will be described. The grass management system in the fifth embodiment is a system configured to display an inclination map of a farm field on a setting screen M1 for setting prohibited positions.

As illustrated in FIG. 16, the grass management system includes a prohibition setting unit 50A, a topographical information detector, and a map creation unit 93. The topographical information detector and the map creation unit 93 are similar to those in the fourth embodiment.

Figure 17:
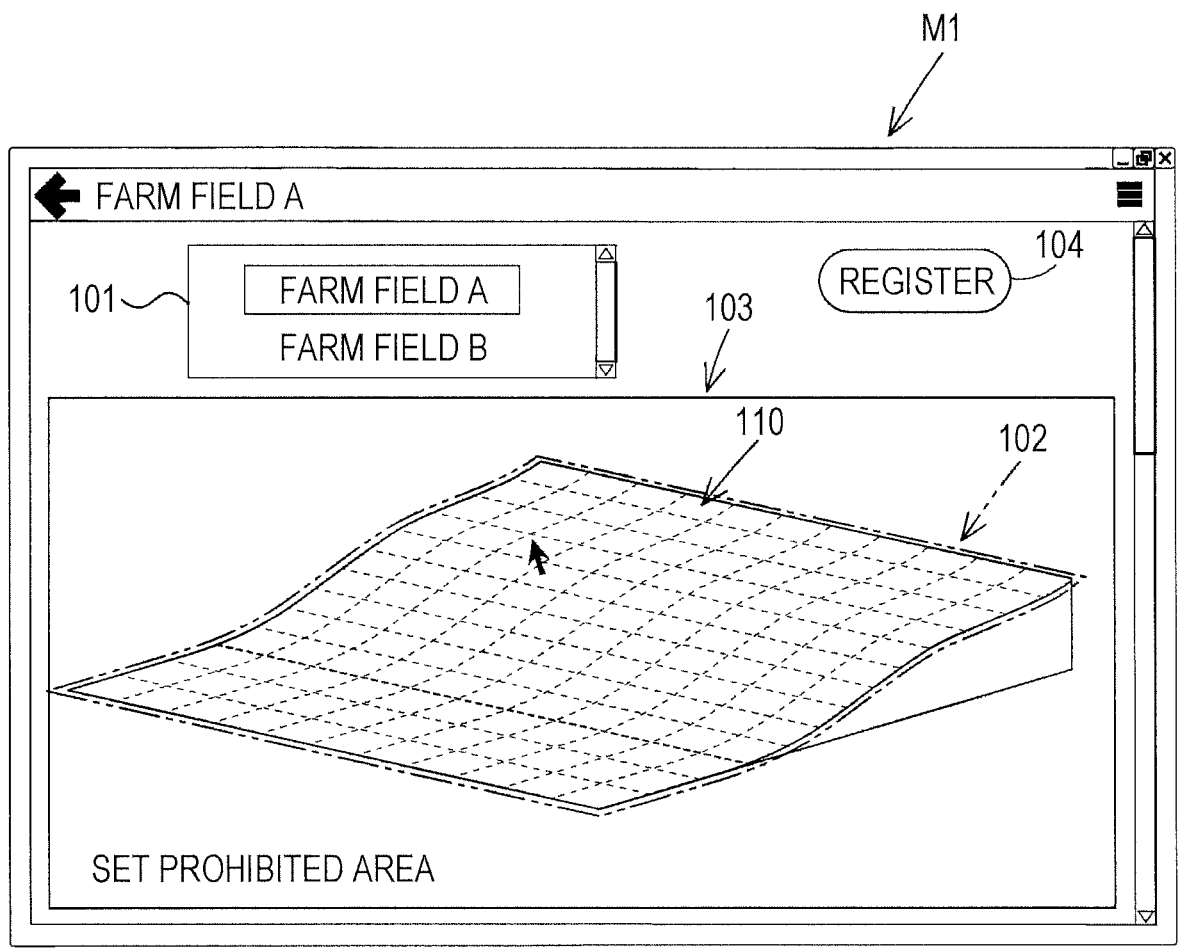
FIG. 17 is a view illustrating an example in which an inclination map is displayed in a setting screen M1.

FIG. 17 is one example in which an inclination map 110 created by the map creation unit 93 is displayed on the setting screen M1. As illustrated in FIG. 17, when an administrator or the like operates a support device 55, the prohibition setting unit 50A causes a display unit 55b of the support device 55 to display the setting screen M1 including a setting part 101 and a farm field display part 103.

In the farm field display part 103, the three-dimensional inclination map 110 created by the map creation unit 93 and three-dimensional fields 102 corresponding to the inclination map 110 are superimposed and displayed. That is, the fields 102 of the farm field set in the setting part 101 and the inclination map 110 set in the setting part 101 are superimposed and displayed on the farm field display part 103. Therefore, the administrator or the like can determine a degree to which the farm field is inclined with respect to the fields 102 from a relationship between the fields 102 and the inclination map 110.

Then, the administrator can set the prohibited positions by selecting a predetermined range of the fields 102 with an input interface while looking at the relationship between the fields 102 and the inclination map 110.

Sixth Embodiment

Figure 18:
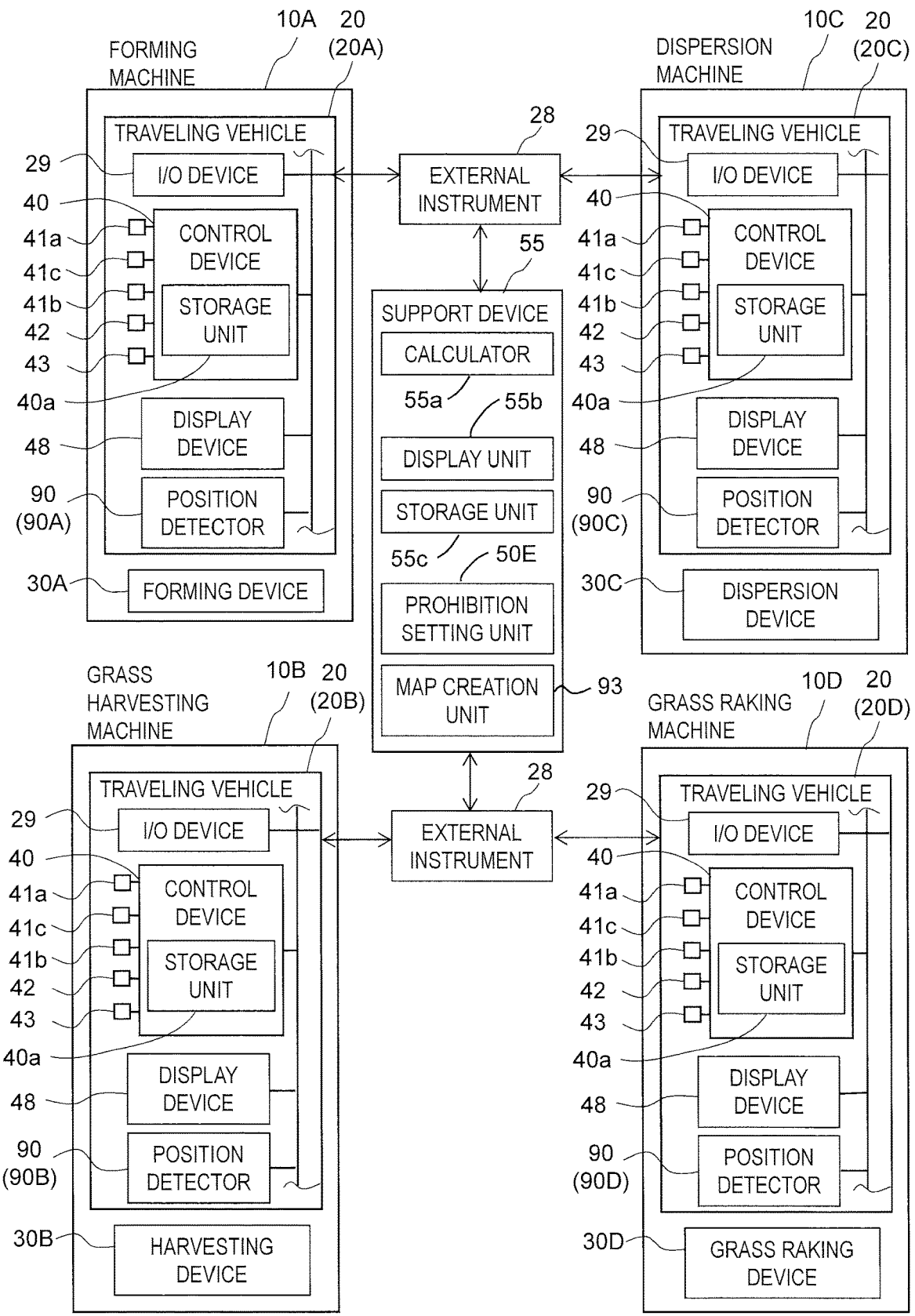
FIG. 18 is an overall diagram of a grass management system in a sixth embodiment.

FIG. 18 is an overall diagram illustrating a grass management system in a sixth embodiment. In the sixth embodiment, a configuration different from the configuration of the embodiments described above will be described. The grass management system in the sixth embodiment is a system configured to set prohibited positions based on a boundary of a farm field obtained from topographical information.

As illustrated in FIG. 18, the grass management system includes a prohibition setting unit 50E and a topographical information detector. The prohibition setting unit 50E includes a program or the like incorporated in a calculator 55a (support device 55) and the like. The topographical information detector is similar to that in the fourth embodiment.

Figure 19:
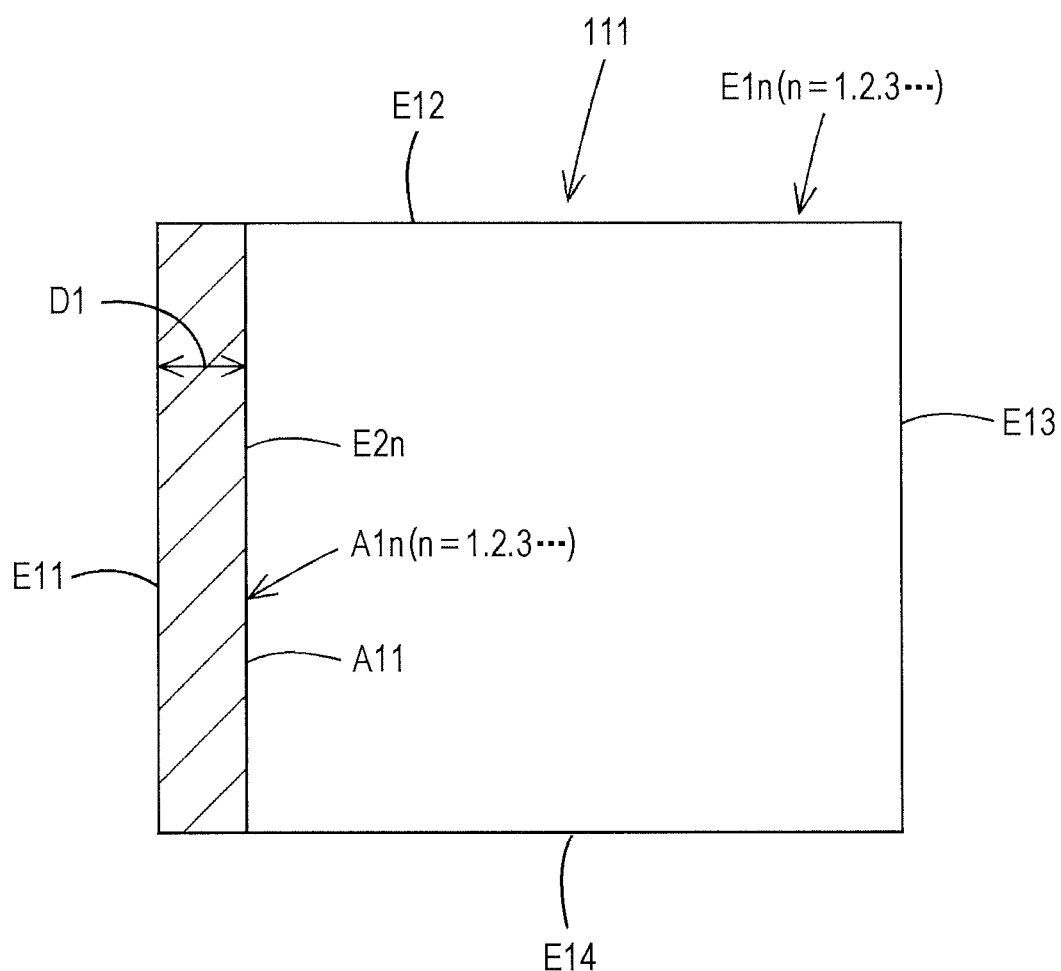
FIG. 19 is a diagram illustrating a farm field map including a boundary line (contour line) E1 of the farm field.

When topographical information (longitude, latitude, height) is input into the support device 55, as illustrated in FIG. 19, the prohibition setting unit 50E creates a farm field map 111 including a boundary line (contour line) E1 of the farm field.

The prohibition setting unit 50E displays the farm field map 111 on a display unit 55b of the support device 55. Here, when the farm field is a polygon and the number of boundary lines indicated in the farm field map 111 is [E1n (n=1, 2, 3, ... )], the prohibition setting unit 50E sets, as the prohibited positions, at least one of prohibited areas A1n formed between the boundary lines E1n of the farm field and imaginary lines E2n obtained by shifting the boundary lines E1n inward of the farm field by a predetermined distance D1.

For example, when the farm field is rectangular and includes the boundary lines E1n (n=1 to 4) indicated in the farm field map 111, of the four boundary lines E11 to E14, the prohibition setting unit 50E sets, as the prohibited positions, for example, positions corresponding to the prohibited area A11 formed between the boundary line E11 and the imaginary line E21 obtained by shifting the boundary line E11 inward of the farm field by the predetermined distance D1.

For example, when the farm field is adjacent to a road or adjacent to a house, the prohibition setting unit 50E applies the boundary line E1n adjacent to the road or the boundary line E1n adjacent to the house as the boundary line E1n for setting the prohibited positions. For example, after the farm field map 111 including the plurality of boundary lines E1n is displayed on the display unit 55b of the support device 55, the boundary line E1n for setting the prohibited positions may be selected by using an input interface, and the boundary lines E1n adjacent to the road or the house may be extracted from the topographical information of the farm field. In this way, when the farm field is adjacent to a road or a house, it is possible to easily set the prohibited positions from the topographical information of the farm field.

Seventh Embodiment

Figure 20:
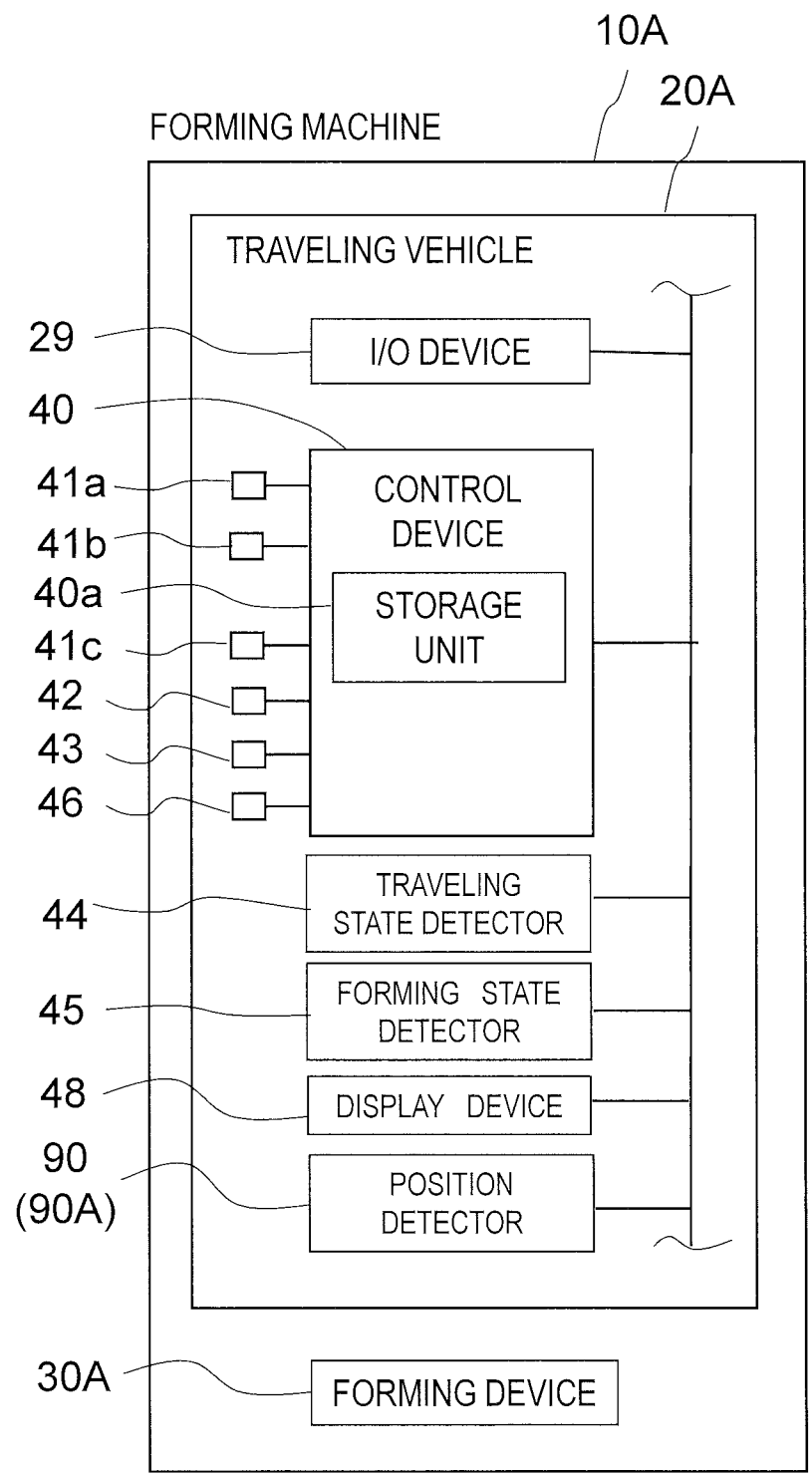
FIG. 20 is a control block diagram of a forming machine in a seventh embodiment.

FIG. 20 is a block diagram illustrating a forming machine in a seventh embodiment. In the seventh embodiment, a configuration different from the configuration of the embodiments described above will be described. The forming machine illustrated in the seventh embodiment is required at least to be a forming machine configured to acquire prohibited positions, and a method of setting the prohibited positions is not limited to the above-described method and may be any method. Note that methods of setting the prohibited positions described in the first to sixth embodiments described above may be applied to the forming machine of the seventh embodiment, or some configurations of the first to sixth embodiments described above may be applied.

The forming machine 10A includes a prohibited position acquisition unit, a discharge operation unit 43, and a traveling state detector 44. The prohibited position acquisition unit and the discharge operation unit 43 are similar to those in the first embodiment. The traveling state detector 44 is a device configured to detect a traveling state of the forming machine 10A, and is, for example, a vehicle speed sensor that detects a traveling speed, a clutch detection sensor that detects a transmission gear of a transmission 23, a brake detection sensor that detects whether braking is applied or not. The traveling state detector 44 is required at least to be a device capable of detecting the traveling state of the forming machine 10A, and is not limited to the vehicle speed sensor, the clutch sensor, the brake detection sensor, and the like.

At the time of forming work by the forming machine 10A, when an operator switches the discharge operation unit 43 from OFF to ON, a control device 40 determines whether or not the forming machine 10A is at a standstill based on the traveling state detector 44. Also, when the forming machine 10A is at a standstill, the control device 40 sets a discharge position DW1 of a formed material K1 at a current machine position detected by a position detector 90A. The control device 40 refers to the discharge position (machine position) DW1 and prohibition information stored in a storage unit 40a and determines whether or not the discharge position DW1 set by the discharge operation unit 43 is set at the prohibited position.

When the discharge position DW1 and the prohibited position do not agree with each other, the control device 40 permits discharge of the formed material K1 and makes a forming device 30A in a gate open state. On the other hand, when the discharge position DW1 and the prohibited position agree with each other, the control device 40 does not permit discharge of the formed material K1 and holds the forming device 30A in a gate closed state.

Therefore, in a manual system in which the operator switches the discharge operation unit 43 from OFF to ON to discharge the formed material K1, when the discharge position DW1 agrees with the prohibited position, even if the discharge operation unit 43 is turned ON, discharge of the formed material K1 can be prevented.

In addition, the forming machine 10A may include a forming state detector 45. The forming state detector 45 is a device configured to detect a forming state of grass formed by a forming unit 38. The forming state detector 45 is, for example, a sensor that detects a roll diameter of the formed material K1 formed by the forming unit 38.

At the time of forming work by the forming machine 10A, when the roll diameter of the formed material K1 detected by the forming state detector 45 is equal to or greater than a threshold (discharge recommended diameter), the control device 40 causes a display device 48 to display guidance indicating that the roll diameter is equal to or greater than the threshold, that is, an accommodation unit 36 is almost full of the formed material K1 (timing of discharging the formed material K1 is approaching). The operator decelerates and stops the forming machine 10A according to the guidance displayed on the display device 48, and then switches the discharge operation unit 43 from OFF to ON. When the forming machine 10A stops, after the control device 40 determines whether or not the discharge position (machine position) DW1 is set at the prohibited position, when the discharge position DW1 does not agree with the prohibited position, the control device 40 discharges the formed material K1, and when the discharge position DW1 agrees with the prohibited position, the control device 40 does not discharge the formed material K1.

Therefore, while the configuration allows the operator to determine that the timing of discharging the formed material K1 is approaching, discharge of the formed material K1 can be prevented only when the discharge position DW1 and the prohibited position agree with each other.

In addition, the forming machine 10A may include a cancel operation unit 46. The cancel operation unit 46 is an operating tool for giving instructions to cancel the prohibited positions. The cancel operation unit 46 is, for example, a switch that can be switched between ON and OFF. The cancel operation unit 46 is provided near a driver's seat and can be operated by the operator. When the cancel operation unit 46 is turned ON, a cancel instruction signal is input into the control device 40, and when the cancel operation unit 46 is turned OFF, the cancel instruction signal is not input into the control device 40. Note that the cancel operation unit 46 may be a switch that can be switched between ON and OFF displayed on the display device 48.

At the time of forming work by the forming machine 10A, when the discharge position DW1 set by the discharge operation unit 43 agrees with the prohibited position, as described in the above embodiments, the display device 48 performs a display indicating that the discharge position and the prohibited position agree with each other by the control of the control device 40. Alternatively, the display device 48 performs a display indicating that the prohibited positions can be canceled by the cancel operation unit 46.

Under the situation where the display device 48 is performing "display indicating that the discharge position and the prohibited position agree with each other" or "display indicating that the prohibited positions can be canceled by the cancel operation unit 46", when the operator switches the cancel operation unit 46 from OFF to ON and performs an operation to cancel the prohibited positions, the control device 40 permits the cancel operation unit 46 to cancel the prohibited positions and makes the forming device 30A in a gate open state.

Meanwhile, after the display device 48 starts performing "display indicating that the discharge position and the prohibited position agree with each other" or "display indicating that the prohibited positions can be canceled by the cancel operation unit 46", when the operation by the cancel operation unit 46 is not performed for a certain period of time and the cancel operation unit 46 is maintained in the OFF state, the control device 40 does not permit discharge of the formed material K1 but holds the forming device 30A in a gate closed state.

Therefore, even when the discharge position agrees with the prohibited position, when the operator checks the state of a farm field and determines that discharge is possible, the operator can cancel the prohibited positions and discharge the formed material K1 by operating the cancel operation unit 46.

Eighth Embodiment

Figure 21:
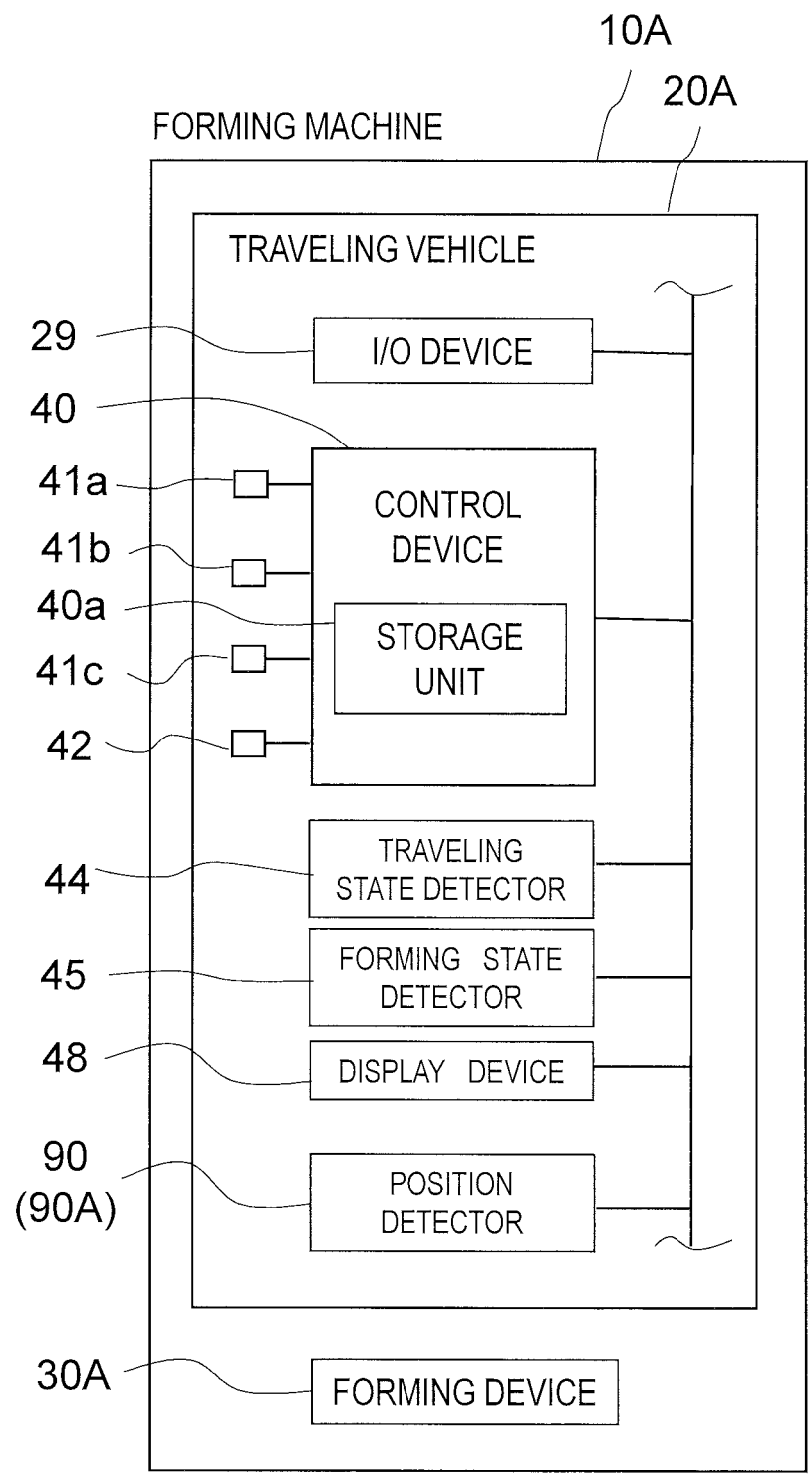
FIG. 21 is a control block diagram of a forming machine in an eighth embodiment.

FIG. 21 is a control block diagram of a forming machine in an eighth embodiment. In the eighth embodiment, a configuration different from the configuration of the embodiments described above will be described. The forming machine illustrated in the eighth embodiment is required at least to be a forming machine configured to acquire prohibited positions, and a method of setting the prohibited positions is not limited to the above-described method and may be any method. Note that methods of setting prohibited positions described in the first to sixth embodiments described above may be applied to the forming machine of the eighth embodiment, or some configurations of the first to seventh embodiments described above may be applied.

The forming machine 10A in the eighth embodiment is a forming machine that automatically discharges a formed material K1 without operation of a discharge operation unit 43. The forming machine 10A includes a prohibited position acquisition unit and a forming state detector 45. The prohibited position acquisition unit and the forming state detector 45 are similar to those in the seventh embodiment.

At the time of forming work by the forming machine 10A, when a roll diameter of the formed material K1 detected by the forming state detector 45 becomes equal to or greater than a threshold (discharge recommended diameter), a control device 40 automatically decelerates the forming machine 10A. Also, after the forming machine 10A decelerates, the control device 40 moves to a preparation stage of a discharge operation by an accommodation unit 36 (discharge unit 37), sets a machine position at the time of entering the preparation stage as a discharge position DW1, and determines whether or not the discharge position DW1 and the prohibited position agree with each other. When the discharge position DW1 and the prohibited position agree with each other, the control device 40 does not perform the discharge operation. On the other hand, when the discharge position DW1 and the prohibited position do not agree with each other, the control device 40 performs the discharge operation. Note that in the above-described embodiments, the machine position at the time of moving to the preparation stage of the discharge operation by the accommodation unit 36 (discharge unit 37) after deceleration of the forming machine 10A has been set as the discharge position DW1; however, instead of this, a position several meters to several tens of meters beyond the machine position in the preparation stage may be set as the discharge position DW1. In other words, a travel distance of the forming machine 10A from the preparation stage until the formed material K1 is discharged to a farm field may be set in advance, and a position obtained by adding the preset travel distance to the machine position in the preparation stage may be set as the discharge position DW1. Note that the setting of the discharge position DW1 described above is one example and is not limited thereto.

Ninth Embodiment

Figure 22:
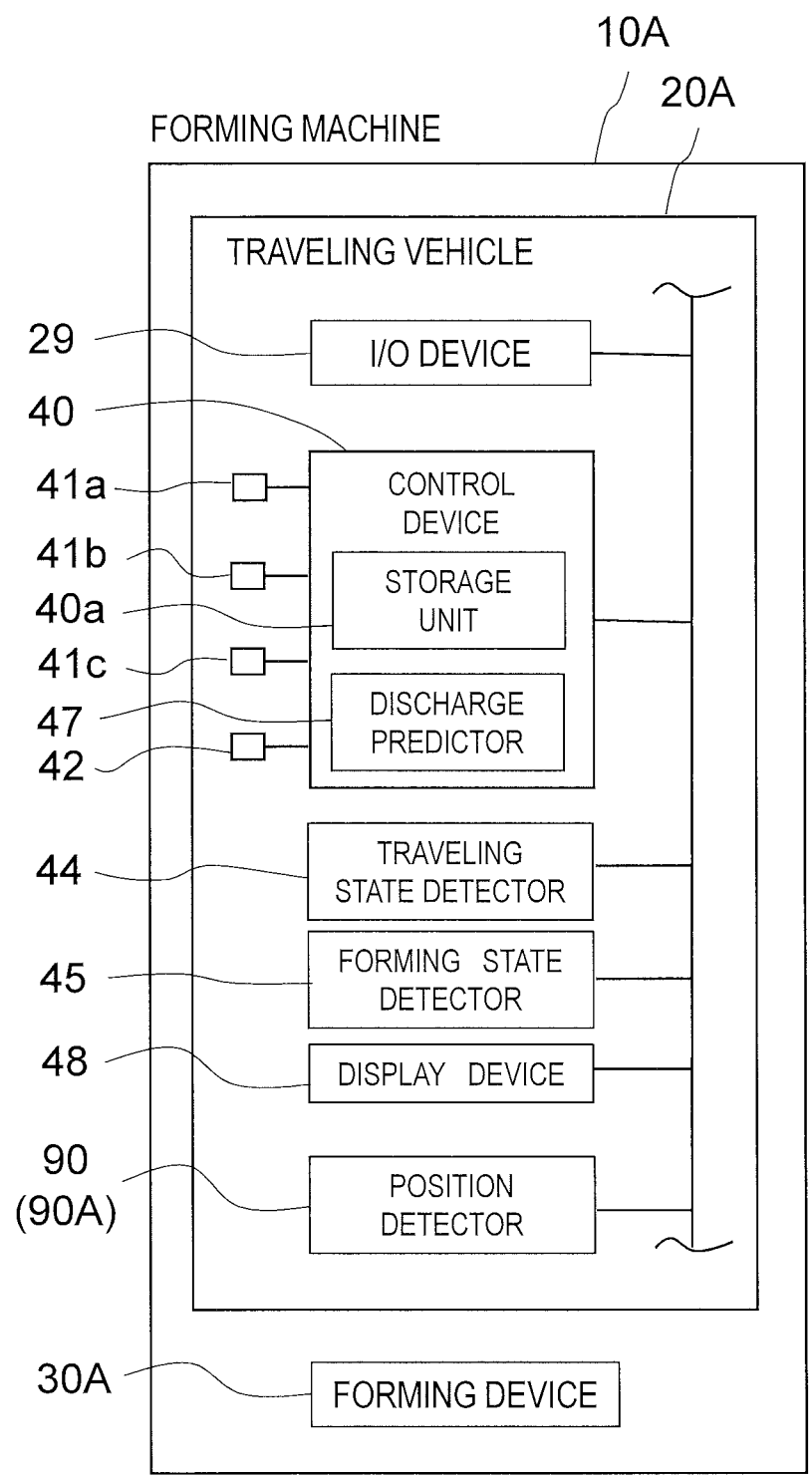
FIG. 22 is a control block diagram of a forming machine in a ninth embodiment.

FIG. 22 is a control block diagram of a forming machine in a ninth embodiment. In the ninth embodiment, a configuration different from the configuration of the embodiments described above will be described. The forming machine illustrated in the ninth embodiment is required at least to be a forming machine configured to acquire prohibited positions, and a method of setting the prohibited positions is not limited to the above-described method and may be any method. Note that methods of setting prohibited positions described in the above first to sixth embodiments may be applied to the forming machine of the ninth embodiment, or some configurations of the first to eighth embodiments described above may be applied.

The forming machine 10A includes a prohibited position acquisition unit, a forming state detector 45, and a discharge predictor 47. The prohibited position acquisition unit and the forming state detector 45 are similar to those in the embodiments described above. The discharge predictor 47 includes electric and electronic components provided in a control device 40, programs incorporated in the control device 40, and the like.

The discharge predictor 47 predicts a discharge position DW1 before discharging a formed material K1 based on a position detected by a position detector 90A (machine position) and a forming state detected by the forming state detector 45. After starting harvest (collection) of grass, the discharge predictor 47 monitors a roll diameter detected by the forming state detector 45 and estimates a position where the roll diameter reaches a threshold (discharge recommended diameter) from an increasing tendency of the roll diameter.

In both of a case where the forming machine 10A is a machine that manually discharges the formed material K1 or a case where the forming machine 10A is a machine that automatically discharges the formed material K1, the discharge predictor 47 adds a travel distance from the point where reaching the discharge recommended diameter until when the forming machine 10A stops to the position estimated (estimated position), and then the discharge predictor 47 sets the position obtained by the addition (estimated position+travel distance) as the discharge position DW1.

Note that the travel distance from the point where reaching the discharge recommended diameter until when the forming machine 10A stops may be stored in advance in the control device 40 or may be calculated by the discharge predictor 47 from past actual results and the like.

Also, after starting harvest (collection) of grass, the discharge predictor 47 has monitored the roll diameter to determine the estimated position from the increasing tendency of the roll diameter; however, the discharge predictor 47 may determine the estimated position by using the increasing tendency of the roll diameter in the past. Also, the method of estimating the discharge position DW1 by the discharge predictor 47 is not limited to the method described above.

Figure 23A:
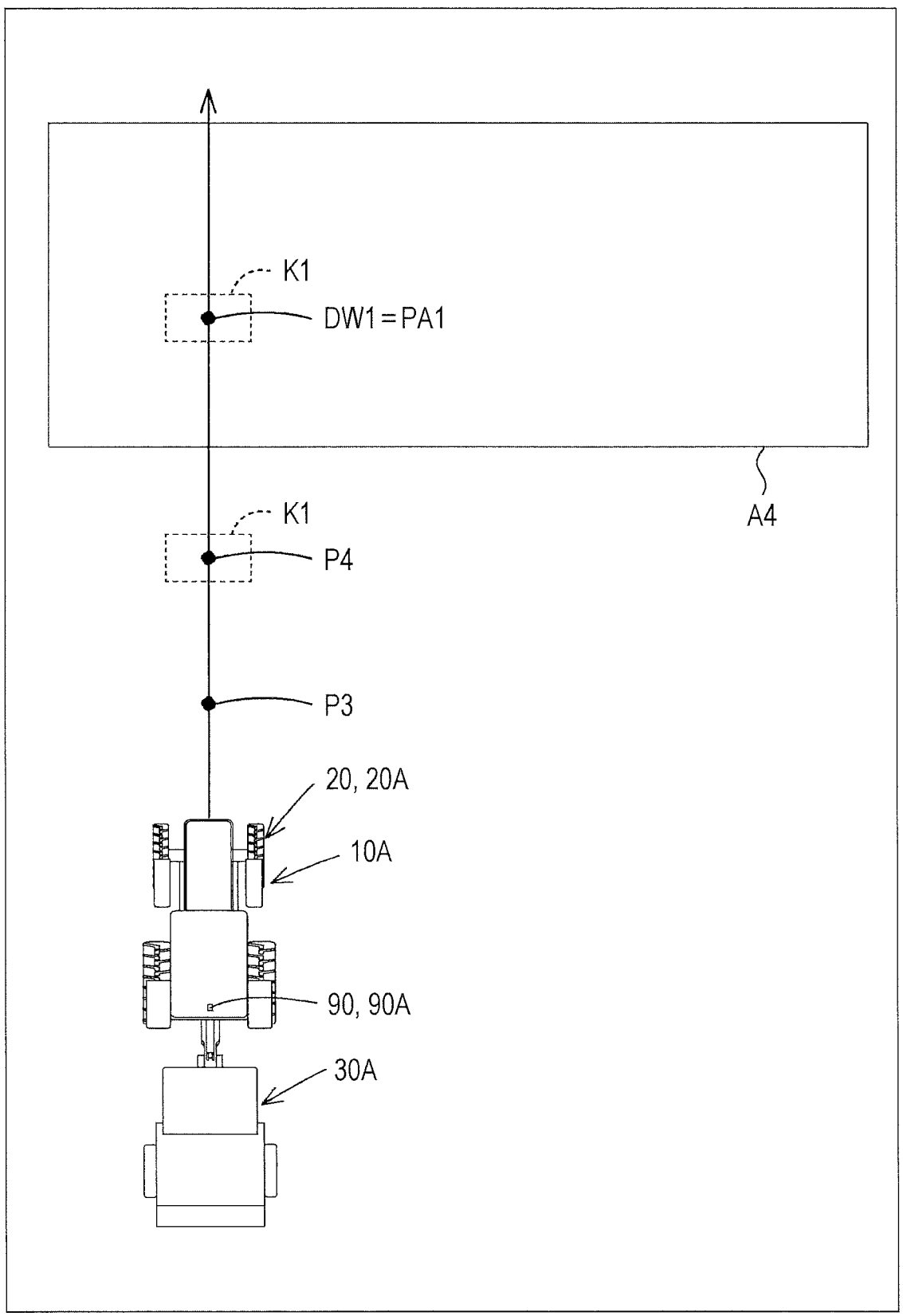
FIG. 23A is a view for changing a discharge position DW1 to a position before a prohibited area A4.

When the discharge position DW1 predicted by the discharge predictor 47 agrees with the prohibited position, the control device 40 causes the discharge unit 37 to perform discharge at a position that is different from the discharge position DW1 predicted by the discharge predictor 47 and does not agree with the prohibited position. When forming work is started by the forming machine 10A and the discharge position DW1 is obtained by the discharge predictor 47, it is determined whether or not the discharge position DW1 obtained by the discharge predictor 47 agrees with the prohibited position. As illustrated in FIG. 23A, under the situation where the forming machine 10A is performing forming work, when the discharge position DW1 is obtained at a position P3 and it is determined that the discharge position DW1 obtained agrees with the prohibited position PA1, the control device 40 controls the forming machine 10A (discharge unit 37) such that the forming machine 10A sets a position before a prohibited area A4 including the prohibited position PA1, for example, a position P4 as the discharge position, and discharges the formed material K1 at the discharge position P4.

Figure 23B:
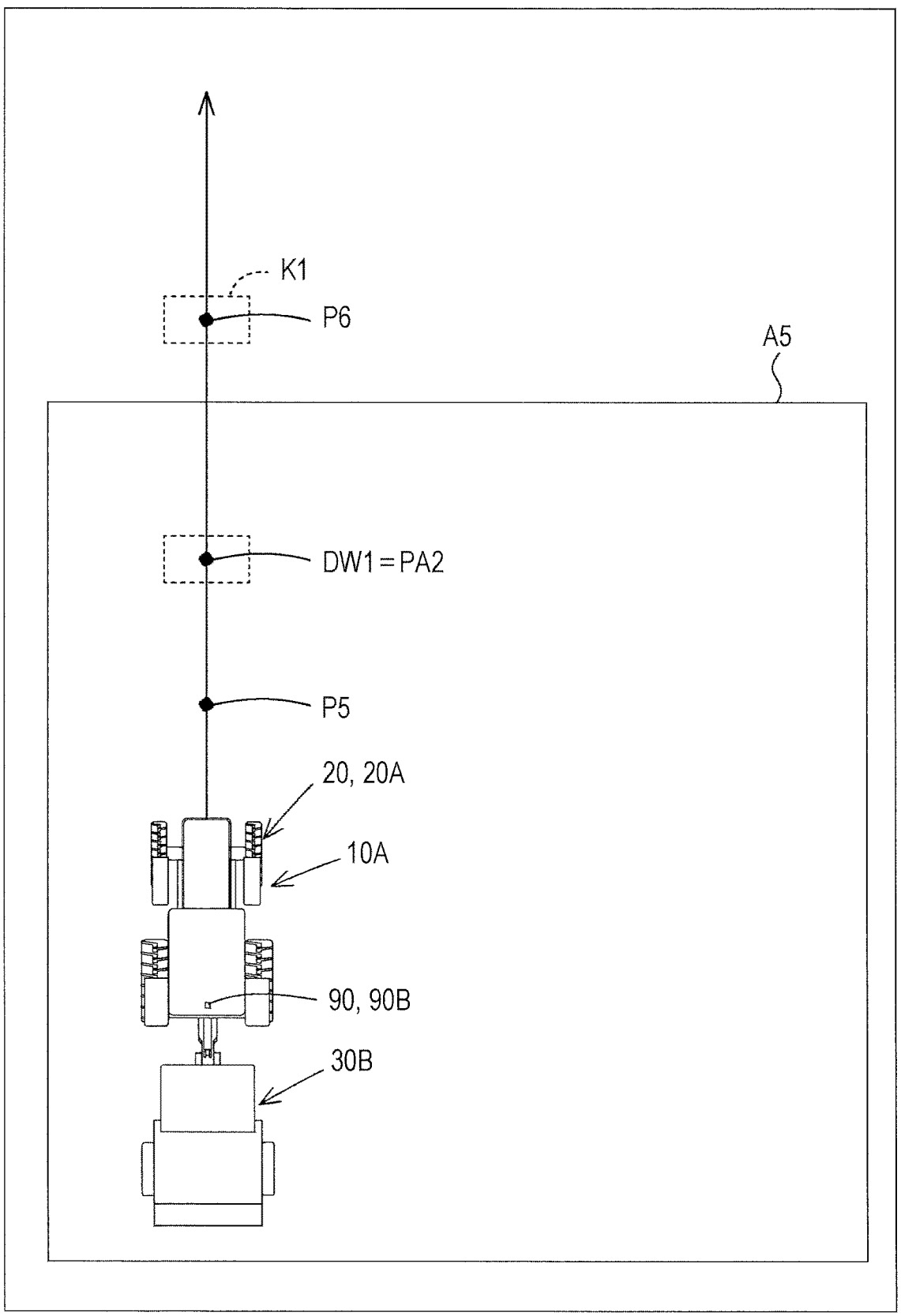
FIG. 23B is a view for changing the discharge position DW1 to a position beyond a prohibited area A5.

Also, as illustrated in FIG. 23B, under the situation where the forming machine 10A is performing forming work, when the discharge position DW1 is obtained at a position P5 in a prohibited area A5 and it is determined that the discharge position DW1 obtained agrees with a prohibited position PA2 of the prohibited area A5, the control device 40 controls the forming machine 10A (discharge unit 37) such that the forming machine 10A sets a position beyond the prohibited area A5, for example, a position P6 as the discharge position, and discharges the formed material K1 at the discharge position P6.

The embodiments disclosed this time are to be considered in all respects as illustrative and not restrictive. The scope of the present invention is indicated by the appended claims rather than by the foregoing description and all changes which come within the meaning and range of equivalency of the claims are therefore intended to be embraced therein.

Note that the forming machine 10A described above has a structure in which the formed material K1 in an accommodation unit 36 is discharged directly to a farm field when an accommodation unit 36 is set in a gate open state; however, the forming machine 10A may be a forming machine including a holding mechanism (discharge unit) that temporarily holds the formed material K1 discharged to the outside from the accommodation unit 36 and discharges the held formed material K1 under the farm field.

Furthermore, an input output device (prohibited position acquisition unit) 29 may be a communication device that can be connected to a support device 55 or the like by wireless communication or the like. The communication device is a device that performs wireless communication by short-distance wireless communication such as WiFi (trademark) and BLE, a cellular phone communication network, a data communication network, or the like. This allows information such as the prohibited position set on the work machine side to be transmitted to the support device 55 and allows the work machine to receive information such as the prohibited position set on the support device 55 side.

A grass management system capable of making a setting for discharge of a formed material in a forming machine capable of forming and discharging grass of a farm field includes a prohibition setting unit configured to set a prohibited position at which the discharge of the formed material is prohibited.

The grass management system further includes a farm field display part configured to display a field of the farm field. The prohibition setting unit sets a predetermined range selected in the field as the prohibited position.

The prohibition setting unit sets the prohibited position based on information at a time of traveling of a work machine to perform work of the grass.

The grass management system further includes: a position detector configured to detect a machine position at the time of traveling of the work machine to perform the work of the grass; and an operation unit provided in the work machine. The prohibition setting unit sets the machine position when the operation unit is operated as the prohibited position.

The grass management system further includes: a position detector configured to detect a machine position at the time of traveling of the work machine to perform the work of the grass; and an inclination detector provided in the work machine and configured to detect an inclination at the time of traveling of the work machine. The prohibition setting unit sets, as the prohibited position, the machine position at which the inclination detected by the inclination detector is equal to or greater than a threshold.

The grass management system further includes: a topographical information detector configured to detect topographical information on topography of the farm field; and a map creation unit configured to create an inclination map of the farm field based on the topographical information. The prohibition setting unit sets, as the prohibited position, a position of the farm field at which an inclination angle indicated in the inclination map is equal to or greater than a threshold.

The farm field display part displays the inclination map.

The grass management system further includes: the topographical information detector configured to acquire the topographical information on the topography of the farm field. The prohibition setting unit sets the prohibited position based on a distance from a boundary of the farm field obtained from the topographical information.

The grass management system further includes a control unit provided in the forming machine and configured not to permit the discharge from the forming machine when the forming machine is at the prohibited position.

The grass management system further includes a notification unit provided in the forming machine and configured to notify that the forming machine is at the prohibited position when the forming machine is at the prohibited position.

The work machine is the forming machine configured to form and discharge the grass.

The work machine is one of a harvesting machine configured to harvest the grass, a dispersion machine configured to disperse the grass, a grass raking machine configured to rake the grass, and a fertilizing machine configured to perform fertilization.

The present embodiment allows easy setting of the prohibited position at which discharge of the formed material formed by the forming machine is prohibited.

Obviously, numerous modifications and variations of the present invention are possible in light of the above teachings. It is therefore to be understood that within the scope of the appended claims, the invention may be practiced otherwise than as specifically described herein.

What is claimed is:

1. A grass management system comprising:
   a baler configured to discharge a bale of grass onto a farm field at a discharge position;
   a position detector configured to detect a current position of the baler; and
   circuitry configured to
      estimate an estimated discharge position at which the bale becomes to have a predetermined size,
      determine a prohibited area,
      determine whether the estimated discharge position is in the prohibited area, and
      set the estimated discharge position as the discharge position if the estimated discharge position is not in the prohibited area, and a position between the current position and the estimated discharge position as the discharge position if the estimated discharge position is in the prohibited area.

2. The grass management system according to claim 1, further comprising:
a display to display the farm field,
wherein the circuitry is configured to determine a range selected in the farm field on the display as the prohibited area.

3. The grass management system according to claim 1, wherein the circuitry is configured to determine the prohibited area based on information at a time of traveling of a work machine to perform work of the grass.

4. The grass management system according to claim 3, further comprising:
a position detection circuit configured to detect a machine position at the time of traveling of the work machine to perform the work of the grass; and
an operation circuit provided in the work machine,
wherein the circuitry is configured to determine the prohibited area such that the prohibited area includes the machine position when the operation circuit accept an operation.

5. The grass management system according to claim 3, further comprising:
a position detection circuit configured to detect a machine position at the time of traveling of the work machine to perform the work of the grass; and
an inclination detection circuit provided in the work machine and configured to detect an inclination at the time of traveling of the work machine,
wherein the circuitry is configured to determine prohibited area such that the prohibited area includes the machine position at which the inclination detected by the inclination detection circuit is equal to or greater than a threshold.

6. The grass management system according to claim 1, further comprising:
a topographical information detection circuit configured to detect topographical information on topography of the farm field; and
a map creation circuit configured to create an inclination map of the farm field based on the topographical information,
wherein the circuitry is configured to determine the prohibited area such that the prohibited area includes a position of the farm field at which an inclination angle indicated in the inclination map is equal to or greater than a threshold.

7. The grass management system according to claim 6, further comprising:
a display,
wherein the display displays the inclination map.

8. The grass management system according to claim 1, further comprising:
a topographical information detection circuit configured to acquire the topographical information on the topography of the farm field,
wherein the circuitry is configured to determine the prohibited area based on a distance from a boundary of the farm field obtained from the topographical information.

9. The grass management system according to claim 1, further comprising:
a control circuit provided in the baler and configured to control an ejecting implement of the baler not to eject the bale when the baler is in the prohibited area.

10. The grass management system according to claim 1, further comprising:
a notification circuit provided in the baler and configured to notify that the baler is in the prohibited area when the baler is in the prohibited area.

11. The grass management system according to claim 3, wherein the work machine is the baler configured to bale the grass and eject the bale.

12. The grass management system according to claim 3, wherein the work machine is one of a harvesting machine configured to harvest the grass, a dispersion machine configured to disperse the grass, a grass raking machine configured to rake the grass, and a fertilizing machine configured to perform fertilization.

13. A grass management system comprising:
a baler configured to discharge a bale of grass onto a farm field at a discharge position;
position detection means for detecting a current position of the baler;
discharge position estimation means for estimating an estimated discharge position at which the bale becomes to have a predetermined size;
prohibited area determination means for determining a prohibited area; and
discharge position setting means for setting the estimated discharge position as the discharge position if the estimated discharge position is not in the prohibited area, and a position between the current position and the estimated discharge position as the discharge position if the estimated discharge position is in the prohibited area.

14. A grass management method comprising:
discharging a bale of grass onto a farm field at a discharge position, by a baler;
detecting a current position of the baler;
estimating an estimated discharge position at which the bale becomes to have a predetermined size;
determining a prohibited area;
determining whether the estimated discharge position is in the prohibited area; and
bale setting the estimated discharge position as the discharge position if the estimated discharge position is not in the prohibited area, and a position between the current position and the estimated discharge position as the discharge position if the estimated discharge position is in the prohibited area.

* * * * *